(12) United States Patent
Choi et al.

(10) Patent No.: US 10,547,334 B2
(45) Date of Patent: Jan. 28, 2020

(54) METHOD AND TERMINAL DEVICE FOR EXECUTING RADIO APPLICATION

(71) Applicant: Industry-University Cooperation Foundation Hanyang University, Seoul (KR)

(72) Inventors: Seung Won Choi, Seoul (KR); Yong Jin, Seoul (KR); Dong Hyun Kuem, Gyeonggi-do (KR); Kyung Hoon Kim, Seoul (KR); Heung Seop Ahn, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 16/077,291

(22) PCT Filed: Feb. 10, 2017

(86) PCT No.: PCT/KR2017/001504
§ 371 (c)(1),
(2) Date: Aug. 10, 2018

(87) PCT Pub. No.: WO2017/138784
PCT Pub. Date: Aug. 17, 2017

(65) Prior Publication Data
US 2019/0089386 A1    Mar. 21, 2019

(30) Foreign Application Priority Data

Feb. 12, 2016   (KR) .................. 10-2016-0016342
Jul. 8, 2016    (KR) .................. 10-2016-0087107
(Continued)

(51) Int. Cl.
*H04M 3/00*     (2006.01)
*H04B 1/00*     (2006.01)
(Continued)

(52) U.S. Cl.
CPC ....... *H04B 1/0003* (2013.01); *G06F 9/45504* (2013.01); *H04W 8/245* (2013.01);
(Continued)

(58) Field of Classification Search
CPC .... H04B 1/0003; H04W 8/245; H04W 88/02; G06F 2009/45562; G06F 2009/45575; G06F 2009/45595; G06F 9/45504
(Continued)

(56) References Cited

U.S. PATENT DOCUMENTS

2004/0030766 A1*  2/2004  Witkowski ............ H04L 41/082
                                                       709/223
2015/0178112 A1   6/2015  Ivanov et al.
2015/0207680 A1*  7/2015  Ivanov .................... H04B 1/40
                                                        455/73

FOREIGN PATENT DOCUMENTS

KR    10-2013-0116039 A    10/2013

OTHER PUBLICATIONS

Vladimir Ivanov et al., "Radio Virtual Machine", ETSI Workshop on Future Radio Technologies—Air Interfaces, Jan. 27-28, 2016, 11 pages.
Chi Young Ahn et al., "Development of Standards for Software Modem-based Multi-mode Terminal for ETSI Standards", Korea Institute of Electromagnetic Engineering and Sciences, Sep. 2013, 21 pages, vol. 24, No. 5.
(Continued)

*Primary Examiner* — Huy C Ho
(74) *Attorney, Agent, or Firm* — Sughrue Mion, PLLC

(57) ABSTRACT

A method and a terminal device for executing a radio application are disclosed. The method for executing a radio application comprises the steps of: allowing a radio virtual machine (RVM) of a reconfigurable mobile device to reference a radio programming interface (RPI); and replacing at least one abstract processing element (APE) of the RVM with at least one elementary RVM according to an RVM hierarchical structure referenced by the RPI.

15 Claims, 20 Drawing Sheets

(30) Foreign Application Priority Data

Aug. 23, 2016 (KR) .......................... 10-2016-0106773
Aug. 31, 2016 (KR) .......................... 10-2016-0111321

(51) Int. Cl.
  *G06F 9/455* (2018.01)
  *H04W 8/24* (2009.01)
  *H04W 88/02* (2009.01)

(52) U.S. Cl.
  CPC ... *H04W 88/02* (2013.01); *G06F 2009/45562* (2013.01); *G06F 2009/45575* (2013.01); *G06F 2009/45595* (2013.01)

(58) Field of Classification Search
  USPC ........................................................ 455/418
  See application file for complete search history.

(56) References Cited

OTHER PUBLICATIONS

Riadh Ben Abdallah et al., "Virtual Machine for Software Defined Radio: Evaluating the Software VM Approach", 2010 30th IEEE International Conference on Computer and Information Technology (CIT 2010); Sep. 16, 2010, 10 pages.
Reconfigurable Radio Systems (RRS); Radio reconfiguration related architecture for Mobile Devices (MD); European Standard; ETSI EN 303 095 V1.3.1, May 2018, 78 pages.
Reconfigurable Radio Systems (RRS); Mobile Device (MD) information models and protocols; Part 4: Radio Programming Interface (RPI); Technical Specification; ETSI TS 103 146-4 V1.1.1; Jan. 2017; 38 pages.
Reconfigurable Radio Systems (RRS); Radio Reconfiguration related requirements for Mobile Devices ; European Standard; ETSI EN 302 969 V1.3.1; May 2018, 22 pages.
International Search Report for PCT/KR2017/001504 dated May 25, 2017 [PCT/ISA/210].

* cited by examiner

METHOD AND TERMINAL DEVICE FOR EXECUTING RADIO APPLICATION

CROSS REFERENCE TO RELATED APPLICATIONS

This application is a National Stage of International Application No. PCT/KR2017/001504 filed Feb. 10, 2017, claiming priority based on Korean Patent Application No. 10-2016-0016342 filed Feb. 12, 2016, Korean Patent Application No. 10-2016-0087107 filed Jul. 8, 2016, Korean Patent Application No. 10-2016-0106773 filed Aug. 23, 2016, and Korean Patent Application No. 10-2016-0111321 filed Aug. 31, 2016.

TECHNICAL FIELD

The present invention relates to a reconfigurable mobile vice (MD) using a radio programming interface (RPI) of a radio application provider that provide a radio application package to a radio app store or the reconfigurable MD in the art relating to radio reconfiguration requirement of a software defined radio (SDR), a digital wireless communication, a radio processor (RP), an application processor (AP), a multi-radio application, a reconfigurable radio systems (RRS), or MD.

Especially, the present invention relates to a radio virtual machine (RVM) of the reconfigurable MD, and more particularly to a method for executing a radio application using a structure of a terminal device capable of executing a user defined functional block (UDFB) included in a radio application configuration code (Apps. configcode) from the radio application provider or the radio app store and the RPI applicable to the structure.

BACKGROUND ART

As communication technology advances, various new kinds of radio applications are being used as adapted for tastes and objectives of users. The most of radio applications, such as a Long Term Evolution (LTE), a Wide-band Code Division Multiple Access (WCDMA), a Worldwide Interoperability for Microwave Access (WiMAX), a Global System for Mobile Communications (GSM), may operate on radio terminals by interworking with a modern embedded in the radio terminal.

In order to make it possible that a radio application controls the modem, a customized module should be developed based on understanding unique instructions of each modem designed by various modem manufactures or having various models. This situation leads to a result that a specific application can be executed on a specific modem designed by a specific manufacturer, or even on a specific model of modem designed by the specific manufacturer. To overcome the above-mentioned problem, different control instruction codes customized for various kinds of modems should be comprised in the radio application, or different executable file for each modem should be built and distributed.

However, since it is practically impossible to optimize the radio application to all the various kinds of modem hardware currently available in the market currently by the above-mentioned methods, there is a problem that a great manpower is needed to develop a radio application.

In order to resolve the above-described problems, there were attempts to produce hardware-independent multi radio applications by using unified instruction sets instead of instruction sets unique for respective manufacturers.

Also, a technology which can convert a manner in which each of a radio base station and a terminal apparatus supports radio frequency (RF) through hardware into a manner in which each of the radio base station and the terminal apparatus supports RF through software. That is, a software defined radio (SDR) technology can make it possible that a single apparatus can support multiple modes, multiples bands, and multiple environments without being restricted to a specific location or time.

If a SDR module is installed in a portable terminal such as a mobile phone, a personal digital assistant (PDA), and a laptop computer, the SDR module can make it possible that the terminal supports different frequency bands and two or more systems. That is, the SDR technology can provide a new communication manner for various wireless networks, various wireless communication systems, various frequency bands, and high-speed data communications in a fourth generation communication pursuing an all internet protocol (All-IP) based wireless multimedia communications.

In connection with the software defined radio (SDR) technology, there exists a software communication architecture (SCA) which is a defacto standard technology. It may comprise specifications related to frameworks for SDR, middleware, and real-time operating system (OS), which guarantees compatibility of interfaces between SDR systems. The core of SCA is a core framework which is a framework specification. In the core framework, various parts constituting radio applications are componentized and the components may be reused and assembled so as to create a new radio application.

In case of SCA, it is possible to make rearrangement of blocks which are already installed in a terminal. However, user-defined blocks to be used for a specific radio application cannot be installed even into SCA compatible terminals having different hardware configurations. Thus, single executable codes cannot be used for all SCA compatible terminals.

This means that executable codes optimized for each hardware configuration on which each SCA compatible terminal is based should be respectively created and distributed. This demands very much time and cost, and makes commercial uses of radio applications difficult. Also, it does not provide baseband application programming interface (API) for implementation of radio applications, and accordingly it makes selective utilization of hardware acceleration functions difficult.

DISCLOSURE

Technical Problem

The purpose of the present invention for resolving the above-described problems is to provide a method for executing a radio application, which is independent on hardware, using a radio virtual machine capable of executing a user defined functional block (UDFB) included in a radio application configuration code with reference to a radio programming interface (RPI).

Also, another purpose of the present invention is to provide a terminal device having a structure of radio virtual machine capable of executing a user defined functional block (UDFB) included in a radio application configuration code with reference to a radio programming interface (RPI) independently of hardware.

Technical Solution

In an aspect of the present invention to achieve the above-described objective, a method for executing a radio application comprises referring to a radio programming interface (RPI) in a radio virtual machine (RVM) of a reconfigurable mobile device and replacing at least one abstract processing element (APE) of a radio virtual machine with at least one elementary radio virtual machine (eRVM) according to RVM hierarchy referring the RPI.

Advantageous Effects

Using the above-described method and terminal device for executing radio application according to the present invention, it is made possible that various radio applications can be installed and reconfigured independently of hardware platforms of mobile devices.

In addition, in aspect of mobile operators, it may become possible to switch radio access technologies of which terminals based on various radio platforms that subscribers are using into desired radio access technologies according to their needs so that flexible operation of mobile networks may be possible.

In addition, in aspect of subscribers, it may become possible that they can use new radio access technologies only by downing a radio application package for a desired radio application and installing the desired radio application in their terminals without purchasing new terminals. Accordingly, the cost of purchasing a new mobile terminal can be reduced, and a single mobile terminal can be used for various radio access technologies, thereby improving user convenience.

BEST MODE

Figure 1:
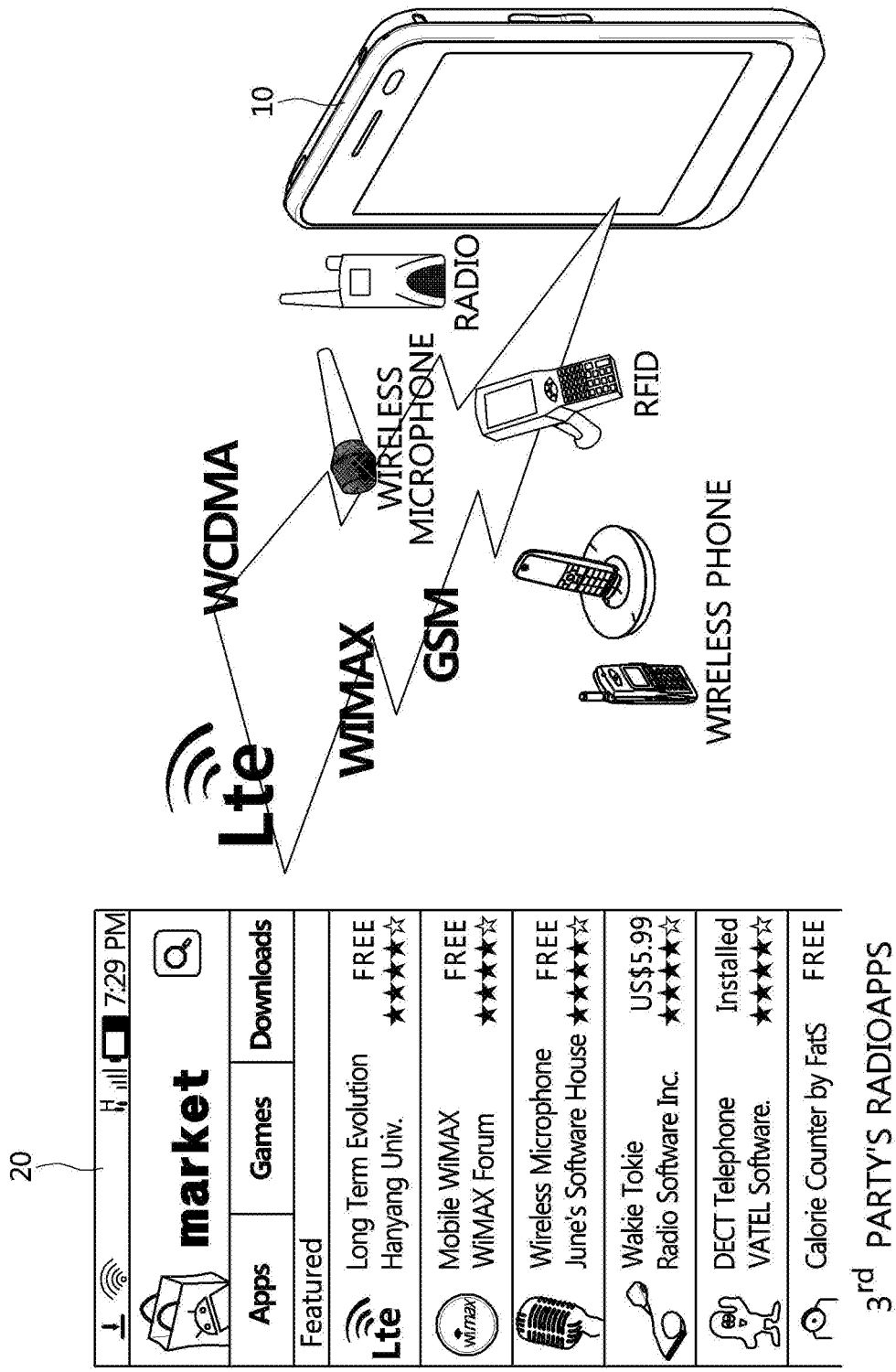
FIG. 1 is a conceptual diagram showing an example in which a terminal device according to an embodiment of the present invention downloads a radio application package distributed by an online application store.

The present invention may be variously modified and may include various embodiments. However, particular embodiments are exemplarily illustrated in the drawings and will be described in detail. However, it should be understood that the particular embodiments are not intended to limit the present disclosure to specific forms, but rather the present disclosure is meant to cover all modification, similarities, and alternatives which are included in the spirit and scope of the present disclosure. Like reference numerals refer to like elements throughout the description of the drawings.

Relational terms such as first, second, A, B, and the like may be used for describing various elements, but the elements should not be limited by the terms. The terms are used solely for distinguishing one element from another. For instance, without departing the scope of the present disclosure, a first element may be named as a second element, and similarly, a second element may be named as a first element. The term "and/or" encompasses both combinations of the plurality of related items disclosed and any item from among the plurality of related items disclosed.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is not for delimiting the present invention but for describing the specific embodiments. The terms of a singular form may include plural forms unless otherwise specified. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Terminologies used for explaining the present invention are defined as follows. Other terminologies except the following terminologies will be defined in the corresponding part of the present specification.

Radio Application (RA): an application which provides a radio communication environment independent on specific hardware configurations and user applications. The radio application may be executed on a radio processor. Alternatively, the radio application may be configured to comprise a part which is executed on a radio processor and a part which is executed on an application processor, and to operate on the two processors. The radio application may comprise a radio controller and function blocks. The function blocks may include standard function blocks and user defined function blocks.

Radio Application Package (RAP): As a distribution form of a radio application, a RAP may include a radio controller and function blocks which are components of the radio application, and also include pipeline configuration metadata. In addition, the radio application package may further include a radio library.

Standard Function Block (SFB): It is a standardized function block each of which has a standardized function and a standardized function name used for calling the function. In case that radio platform chip vendors develop the standard function blocks, the standard function blocks may be a set of function blocks implemented by the vendors, and may be provided with a driver used for driving the blocks. The standard function blocks may be implemented by using a dedicated hardware accelerator, or implemented as executable codes to be executed on a radio processor core. If the standard function blocks are implemented as executable codes to be executed on a radio processor core, a set of the standard function blocks may be referred to as a radio library. Each of the standard function blocks has standardized name and feature for its function, and may be defined by using a standard baseband Application Programming Interface (API) header.

User-Defined Function Block (UDFB): It is a function block which can be provided by radio application providers. A UDF may have a function which is not provided as a standard function block or a function which is customized from an existing standard function block. It may be implemented to be executed on a radio processor core. The user-defined function blocks may be provided in forms of executable codes, source codes, or intermediate representation (IR) codes.

User Defined Function Block (UDFB) set: A set of user-defined function blocks which are provided by radio application providers.

Radio Hardware Abstract Layer (HAL): It is a layer abstracting various kinds of hardware in aspect of an operating system (OS). Since standardized abstract interfaces of accelerator are independent on hardware, HAL enables OS to access all types of hardware. A role of HAL is similar to a role of driver. However, HAL is included in OS differently from drivers which may change according to hardware changes.

Radio Platform Driver: It is software needed for OS to recognize hardware. This is software matching OS instructions which are independent on hardware with hardware-instructions, and may act as a usual hardware driver Radio Platform: It may be a part of mobile device hardware related to RF functions, such as fixed and/or programmable hardware accelerator, RF transceiver, and antenna. That is, the radio platform may be a part of hardware which can generate or receive RF signals. Basically, the radio platform may be heterogeneous hardware including different processing elements such as fixed accelerators (for example, application-specific integrated circuit (ASIC)) or reconfigurable accelerators (for example, FPGA).

Radio Computer: It may be a combination of a radio processor (RP) and a radio platform in a reconfigurable mobile device. In a mobile device, individual radio application may be designed as software elements executable on a radio processor which can be considered as a general-purpose computing element.

Hereinafter, exemplary embodiments of the present invention will be described in detail with reference to the accompanying drawings. In describing the invention, to facilitate the entire understanding of the invention, like numbers refer to like elements throughout the description of the figures, and a repetitive description on the same element is not provided.

FIG. 1 is a conceptual diagram showing an example in which a terminal device according to an embodiment of the present invention downloads a radio application package distributed by an online application store.

Referring to FIG. 1, a terminal device 10 according to an embodiment of the present invention may download a radio application from a radio application store or a radio application provider, install it, and operate in various wireless communication network environments.

That is, a terminal device 10 may access an on-line application store 20, select a desired radio application in a list of radio applications provided by the on-line application store, which support various radio access technologies, and download a radio application package corresponding to the selected radio application.

The various radio access technologies may include Long Term Evolution (LTE), Wideband Code Division Multiple Access (WCDMA), Worldwide Interoperability for Microwave Access (WiMax), Global System for Mobile Communications (GSM), Radio-Frequency Identification (RFID), and so on. The user may freely select a radio application to be used situationally among a plurality of radio applications which have been downloaded and installed in the terminal, FIG. 2 is a block diagram explaining software architecture of a terminal device according to an embodiment of the present invention.

Figure 2:
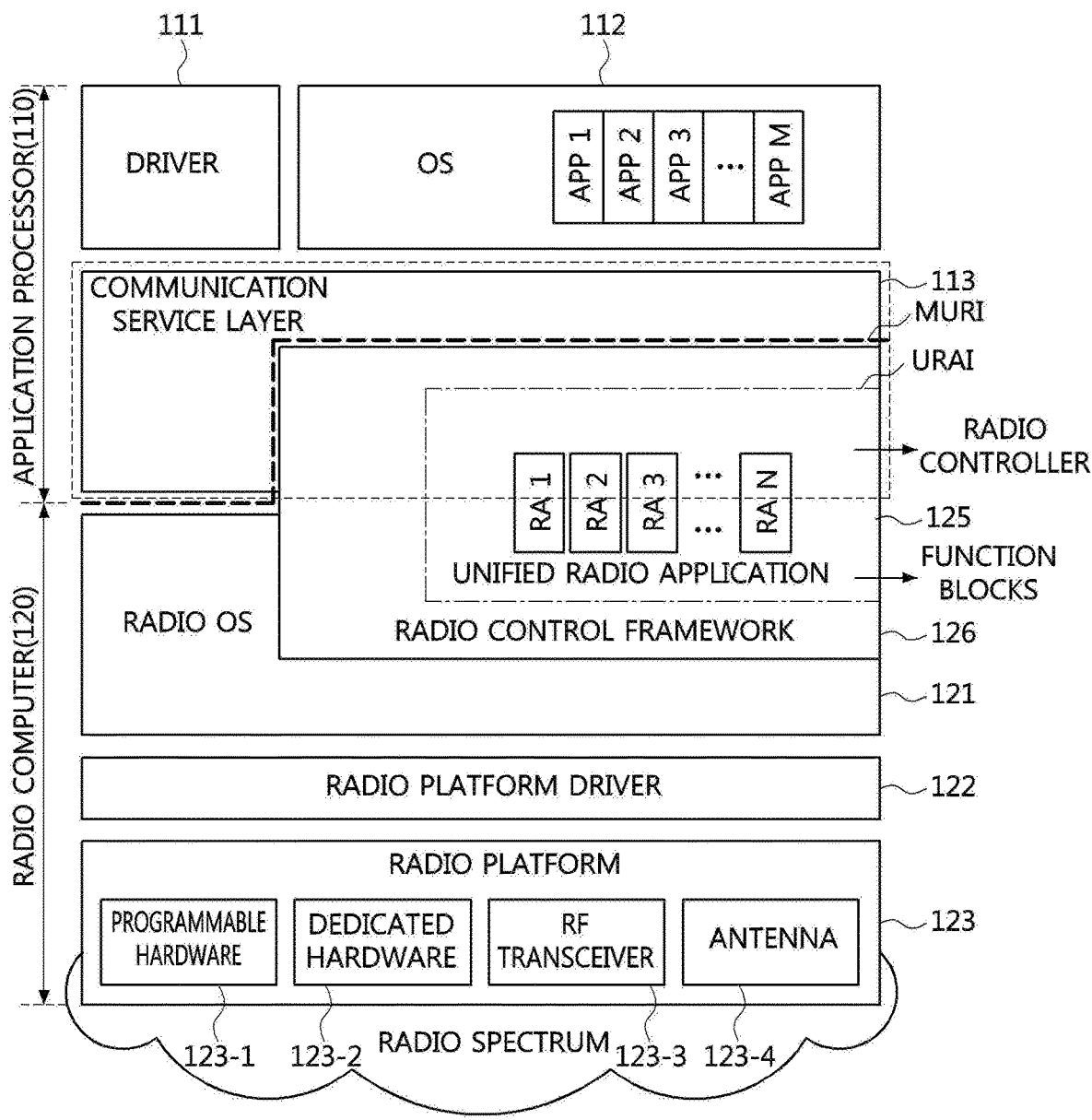
FIG. 2 is a block diagram explaining software architecture of a terminal device according to an embodiment of the present invention.

Referring to FIG. 2, a radio software architecture of a terminal device according to the present invention may comprise an AP layer which operates on an application processor (AP) and a RP layer which operates on a radio processor (RP). Here, the RP may be also referred to as a baseband processor (BP). The combination of the RP and the radio platform may be referred to as the radio computer.

That is, FIG. 2 illustrates a software architecture environment where a radio control framework (RCF), which is described later, is divided into two parts—a part being executed on the AP (referred to as an AP layer part) and a part being executed on the RP (referred to as a RP layer part), and executed on the two processors. Of course, the RCF may be implemented to operate on the RP and a radio operating system.

A non-real time OS such as Andriod OS of Google, iOS of Apple, etc. may operate on the AP, and a real time OS (hereinafter, referred to as a 'radio OS') may operate on the RP. Hereinafter, for clear discrimination, the non-real time OS operating on the AP layer may be referred to as 'OS', and the real time OS operating on the RP layer may be referred to as 'radio OS'.

Components constituting the AP layer, the RP layer, and the RCF will be described in more detail as follows.

Application Processor

The AP 110 may comprise, as shown in FIG. 2, the following components such as drivers 111, an OS 112, and a communication service layer (CSL) 113.

The drivers 111 may drive hardware devices on a given OS 112. The hardware devices may include a cap era, a speaker, etc.

The OS 112 may be a non-real time OS such as Android and iOS operating in general mobile devices. If the RCF 126 is configured to operate on the AP 110 and the RP 610 both, an AP layer execution part of the RCF 126 may exist on the OS 112.

The CSL 113 may provide at least some of the following three services to the RCF 126.

The first service is related to an administrative. It may be a service related to installation/uninstallation of radio applications, creating/deleting instance of radio applications, and acquisition of a list of radio applications in each status (installed, instanced, activated).

The second service is related to connection control. It may be a service related to activation/deactivation of radio applications, creation of data flow, creation of network allocation, and acquisition of a list of radio applications in each status (installed, instanced, activated).

The third service is related to data flow. That is, this service is a service related to sending/receiving user data.

As an example of CSL 113 configurations for providing at least some of the above-described three services, the CSL may be configured to comprise an administrator application, a mobility policy manager application, a networking stack, and a monitor application. The networking stack may comprise a protocol stack operating in the CSL.

Meanwhile, the CSL 113 may comprise only some of the above-described components, and may further comprise additional components as well as the above-described components. Also, two or more components among the above components may be integrated into a single component existing within the CSL 113. Also, the above-described components are only examples of components which the CSL 113 can comprise in order to support services which should be performed by the CSL 113. That is, the CSL 113 may be defined based on functions performed by it and the above-described exemplary composition of components does not restrict composition of the CSL 113.

In the configuration in which the RCF 126 operates on both the AP 110 and the RP 610, radio applications, which become targets of distribution, installation, and execution of the terminal device 10 according to the present embodiment, may respectively comprise the AP layer execution parts and the RP layer execution parts. A radio controller (RC) Which is the AP layer execution part of each radio application may be configured to transmit context information to the monitor application of the CSL 113, transmit data to the networking stack of the CSL 113, and receive data from the networking stack.

Radio Computer

The RP 610 may comprise, as shown in FIG. 2, the following components such as a radio OS 121, radio platform drivers 122, radio platform 123, etc.

A radio OS 121 is a real time operation system. If the RCF 126 is configured to operate on both of the AP 110 and the RP 610, a RP execution part of the RCF 126 may exist on the radio OS 121.

The Radio platform drivers 122 may be components demanded for the radio OS 121 to recognize a hardware radio platform similarly to usual hardware drivers.

If the RCF 126 operates only on the RP 610 (refer to FIG. 3), radio applications, which become targets of distribution, installation, and execution of the terminal device 10 according to the present embodiment, may operate on the RP layer.

The radio controller (RC) of respective radio applications may be configured to transmit context information to the monitor application of the CSL 113, transmit data to the networking stack of the CSL 113, and receive data from the networking stack.

The above-described RP 610 may constitute a radio computer 120 together with the radio platform 123 or the radio platform hardware. Here, the radio platform hardware may be configured as programmable hardware 123-1 of the RP and baseband accelerator(s) 123-2. The baseband accelerator 123-2 prepared for the standard function block(s) 517-1~M may usually be provided in form of application-specific integrated circuit (ASIC). Also, the radio platform 123 may include a RF transceiver 123-3 and an antenna 123-4.

A multi-radio interface (MURI) is used as an interface between the above-described CSL 113 and the RCF 126, and a unified radio application interface (URAI) is used as an interface between RCF 126 and a unified radio application 125. Also, a reconfigurable radio frequency interface (RRFI) is used as an interface between the unified radio application 125 and the RF transceiver 123-3.

A radio application is an application enabling communications of a mobile terminal, and may be distributed in form of a radio application package (RAP) 510. The RAP 510 may comprise components such as function block (FB), pipeline configuration metadata 513, radio controller code (RC code) 512, and radio library 514.

The radio library 514 may be distributed in form of executable codes as included in a RAP 510, in a case that the standard function block (SFB) 517-1 is distributed as executable codes, the RAP 510 may be downloaded onto the OS 112 of the AP 110, and configuration codes (Config-codes) and the radio library 513 may be loaded from the AP 110 to the RP 610 or the radio OS 121 and finally loaded to the radio computer.

Software Architecture of RRFI

Figure 3:
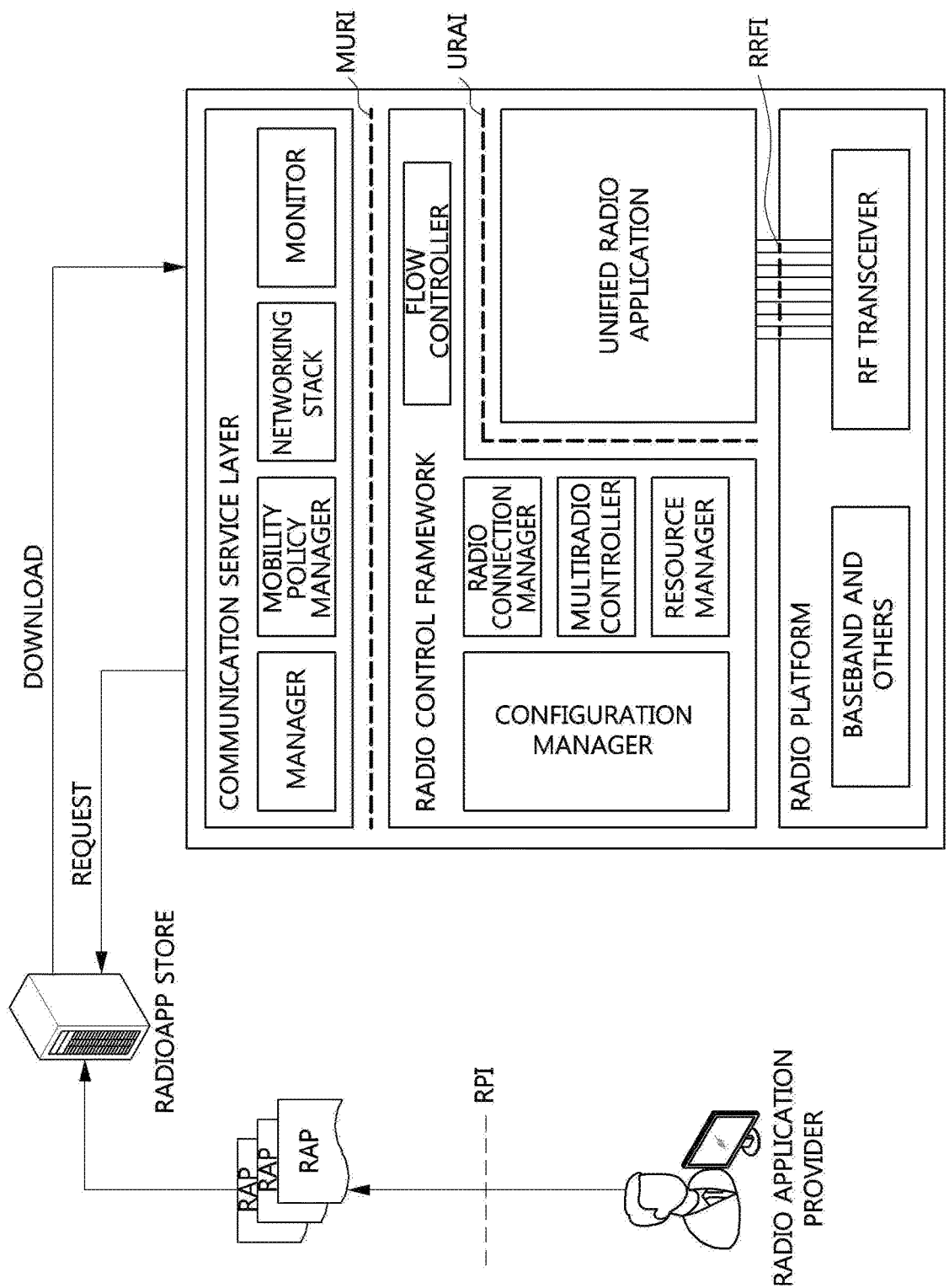
FIG. 3 is a conceptual diagram explaining interfaces related to a terminal device in an environment for radio reconfiguration of a terminal device of FIG. 2.

FIG. 3 is a conceptual diagram explaining four interfaces related to a terminal device in a usage environment of a reconfigurable terminal device according to an embodiment of the present invention.

Referring to FIG. 3, a reconfigurable terminal device according to an embodiment of the present invention may be capable of running multiple radios simultaneously and of changing the set of radios by loading new RAPs. All Radio Applications (RAs) may be called as Unified Radio Applications (URAs) when they exhibit a common behavior from aspect of radio reconfiguration of the terminal device.

In order to run multiple URAs, the reconfigurable terminal device (hereinafter, referred to simply as 'terminal device') may include the CSL, RCF, radio platform and 4 sets of interfaces for their interconnection.

The four interfaces related to the reconfigurable terminal device according to an embodiment of the present invention may include a Multi Radio Interface (MURI) which is an interface between respective components of the CSL and RCF, a Reconfigurable Radio Frequency Interface (RRFI) which is an interface between a URA and a RF transceiver, a Unified Radio Application Interface (URAI) which is an interface between an URA and respective components of the RCF, and a Radio Programming Interface (RPI) which is an interface allowing an independent and uniform production of RAs.

The RPI is an interface defined between a radio application provider and a terminal device or the radio application provider and a radio application store, and the radio application provider may build and distribute a radio reconfigurable application executed in the terminal device with reference to the RPI.

Radio Control Framework

The above-described radio control framework (RCF) 126 will be described in more detail as follows.

The RCF 126 is a component for providing operation environment of radio applications.

If the RCF 126 is configured to operate on both the AP 110 and the RP 610, components of the RCF 126 may be classified into two groups. That is, one group operates on the AP 110, and other group operates on the RP 610. Which components of the RCF 126 operate on the RP (i.e. in real-time) and which components of the RCF operate on the RP (i.e. in non-real-time) may be determined differently by each vendor.

Basically, the RCF 126 may include at least some of the following 5 components for managing radio applications.

A configuration manager (CM) performs installation/uninstallation and creating/deleting instance of RAs for a multi radio terminal apparatus as well as access management of radio parameters for RAs.

A radio connection manager (RCM) performs activation/deactivation of RAs according to user requests, and overall management of user data flows, which can also be switched from one RA to another.

A flow controller (FC) performs sending and receiving of user data packets and controlling the flow of signaling packets.

A multi radio controller (MRC) performs scheduling the requests for radio resources issued by concurrently executing RAs and detecting and managing the interoperability problems among the concurrently executing RAs.

A resource manager (RM) performs managing multi-radio resources to share them among simultaneously active RAs, and to guarantee their real-time requirements.

However, the RCF 126 may comprise only some of the above-described 5 components, and may further comprise additional components as well as the following 5 components. Also, one or more components among the following components may be integrated into a single component existing within the RCF 126. The function and role of the RCF 126 may be defined based on functions performed by the components which will be described and the following exemplary components do not restrict composition of the RCF 126. That is, the RCF 126 may have various configurations for performing at least some of functions of the following components.

Figure 4:
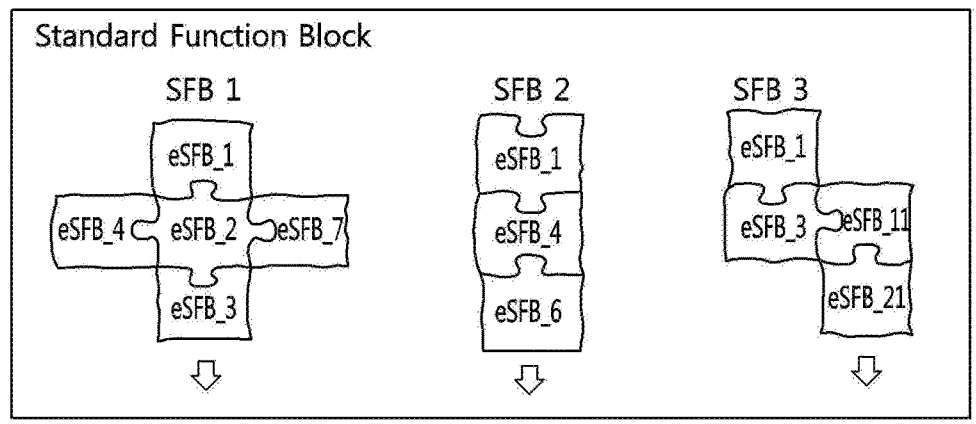
FIG. 4 is a conceptual diagram illustrating a standard function block (SFB).

FIG. 4 is a conceptual diagram illustrating a standard function block (SFB).

Referring to FIG. 4, a content of a component of SFBs 517-1 to 517-M that may be used in a step of building a radio application code for a reconfigurable communication system is described.

A radio application (RA) used in a reconfigurable terminal device a multi-mode terminal device) may be configured according to satisfy various communication standards. The RA is a software code capable of operating in a multi-mode terminal, and may be software designed to comply with all existing mobile communication standard specifications such as CDMA, WCDMA, HSPA, LTE, LTE-A, and Wi-Fi, etc. A reference radio library 220 may be existed as a standard library that may be used in the step of building the RA, and the reference radio library 220 may be include the SFBs 517-1 to 517-M.

The above-mentioned SFBs 517-1 to 517-M may be general functions that are commonly used in several RAs built to satisfy various communication standards, and also may be implemented as a combination of elementary standard functional blocks (eSFBs) to ensure execution by any radio computer (multi-mode terminal device).

The eSFB may be included in the reference radio library 220 and may be one of the SFBs 517-1 to 517-M. The feature of the eSFB is that it can no longer be divided into smaller units. In other words, the SFBs may exist in several granularities (for example, large granularity is LTE and small granularity are Adder, Multiplier, etc.), and the eSFB may refer to the smallest SFBs among them. As mentioned above, as shown in FIG. 4, remaining SFBs except for the eSFBs may be represented by a combination of the eSFBs.

The eSFB may be configured to the most basic operations such as arithmetic operations, bit operations, or logic operations, etc. The eSFB may be the smallest single object that can be abstracted into an abstract processing element (APE) 460 of a radio virtual machine (RVM) 515 as an element of the SFB.

The SFBs 517-1 to 517-M included in the reference radio library 220 may be selected according to a constant criterion.

Figure 5:
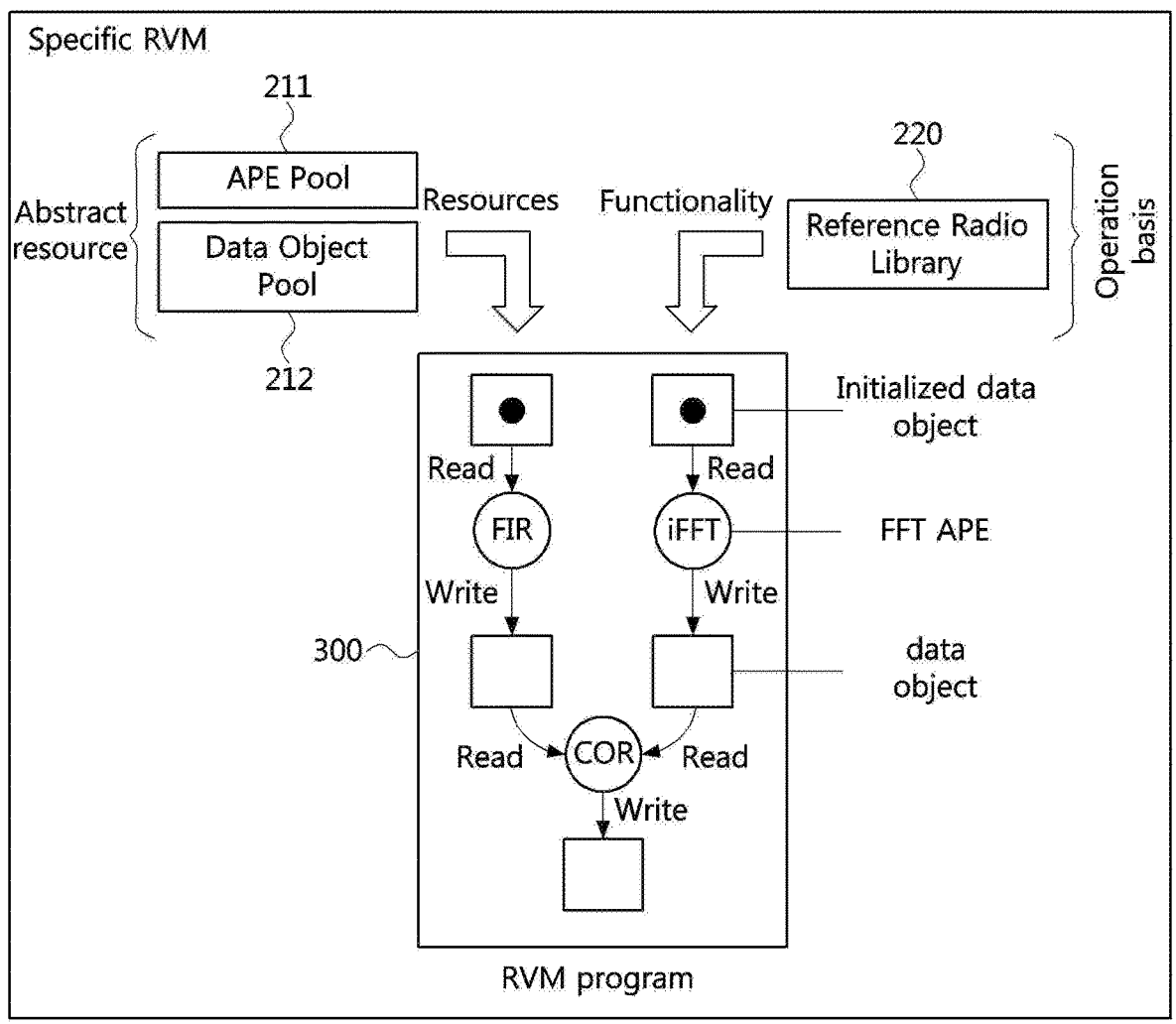
FIG. 5 is a conceptual diagram illustrating a diagram for a radio virtual machine (RVM) processing.

FIG. 5 is a conceptual diagram illustrating a diagram for a radio virtual machine (RWM) processing.

Referring to FIG. 5, the RVM 515 may be an abstract machine capable of executing a configuration code (Configcode). Also, the RVM may be hardware independent. An implementation of RVM may target a specific radio computer. The RVM may also include a back-end compiler that provides just-in-time (JIT) and ahead-of-time (AOT) method for editing the configuration code into executable code.

The RVM 515 may be an abstract machine executing a specific algorithm represented in a data flow chart form format. In other words, the RWM 515 may be a result of respectively replacing all operators and tokens in the specific data flow chart of APEs 460 and data objects (DOs) 470.

Each APE 460 executes a computation indicated by the replaced operator identifier. The computation may be received by each APE 460 from a reference radio library. The APE 460 may abstract computational resources corresponding to operations in the specific data flow chart.

A data object 470 abstracts a memory resource. In order words, the data object 470 may be an abstracted memory for storing data used during radio processing. The reference radio library may include normative descriptions of all standard function blocks (SFBs).

The computation included in the radio library may be represented in terms of a normative description or a native implementation of the SFBs according to whether the radio library 514 is respectively used for front-end or back-end editing.

A user defined functional block (UDFB) 516 may be created through a combination of the SFBs. The UDFBs 516 may be represented as a data flow chart to be executed in the RVM 515.

Alternatively, the UDFBs 516 may be implemented as a stand-alone module or as a stand-alone function. The UDFBs 516 may be part of a radio application package. RVM 515 may begin to operate immediately after initialization of some data objects 470. All APEs 460 may execute computation asynchronously and concurrently. If all of input data objects 470 are full, an individual APE 460 may execute an allocated operator.

The APEs 460 may access a data object 470 using "read", "read-erase", or "write" operators. After reading input data from the data object 470, an APE 460 may execute the allocated operator if output data object 470 is empty, then the APE 460 may write processed data. A full output data object 470 may prevent an operation corresponding to writing. The RVM 515 may execute computation until all of the APEs 460 reach an inactivation state.

In this state, a sufficiently full data object 470 capable of activate an inactive operator may not exist. For example, an operator "N" input/output data object 470 and a "K<N" input data object 470 may be full. As a result, the APE 460 may not be activated again. The result of the computation may be a full data object 470 that cannot activate the inactivity operator.

The output data object 470 may be an input data object 470 for a subsequent operator. The input data object 470 may then activate a subsequent operator. A state or operation received from the APE 460 may be independent on the state of other APEs 460.

A specific RVM may process resources provided by abstract resources such as an abstract processing element (APE) pool 211 and a data object pool 212 through an RVM program. The specific RVM may also process through a functionality RVM program provided as an operation basis such as a radio library 514.

The RVM program may read an initialized data object, write a data object (DO) after processing the initialized data object through an abstract processing element (APE) or a filter that performs a finite impulse response (FIR) and/or an inverse fast fourier transform (IFFT), and write (abstract) a final processing result according to a correlation between the FIR-processed data object 470 and the IFFT-processed data object 470.

According to the specific RVM, a radio application may include modules of different granularity. The modules may be obtained from a radio library 514 or may be configured to radio library elements. The modules may also be capable of simultaneous operation and data-driven execution, and static or dynamic application expansions.

A radio virtual machine (RVM) 515 according to the present embodiment is a RVM hierarchy. That is, the radio virtual machine 515 may include data objects (DOs) 470, abstract processing elements (APEs) 460, an abstract switch fabric (ASF) 440, a control unit (CU) 430, and an elementary radio virtual machine (eRVM) 490. The RVM 515 may be an RVM hierarchy, including an eRVM 490.

The eRVM 490 described above may function as the APE 460. The control unit (CU) may be connected to the DO(s) 470 corresponding to the APE(s) 460 via the ASF 440, similar to the eRVM of FIG. 6. The eRVM 490 may replace at least some of the APEs 460 of the RVM 515. That is, data may be connected to the APE 460 as well as the eRVM 490 when the eRVM 490 replaces some of the APEs 460.

A typical embodiment existing an eRVM 490 in a RVM 515 is that a configuration code includes a user defined functional block (UDFB) as well as standard functional blocks (SFBs). All the standard function blocks in the configuration code may be implemented using the radio library 514, and the UDFB may be implemented independently using the eRVM.

Figure 6:
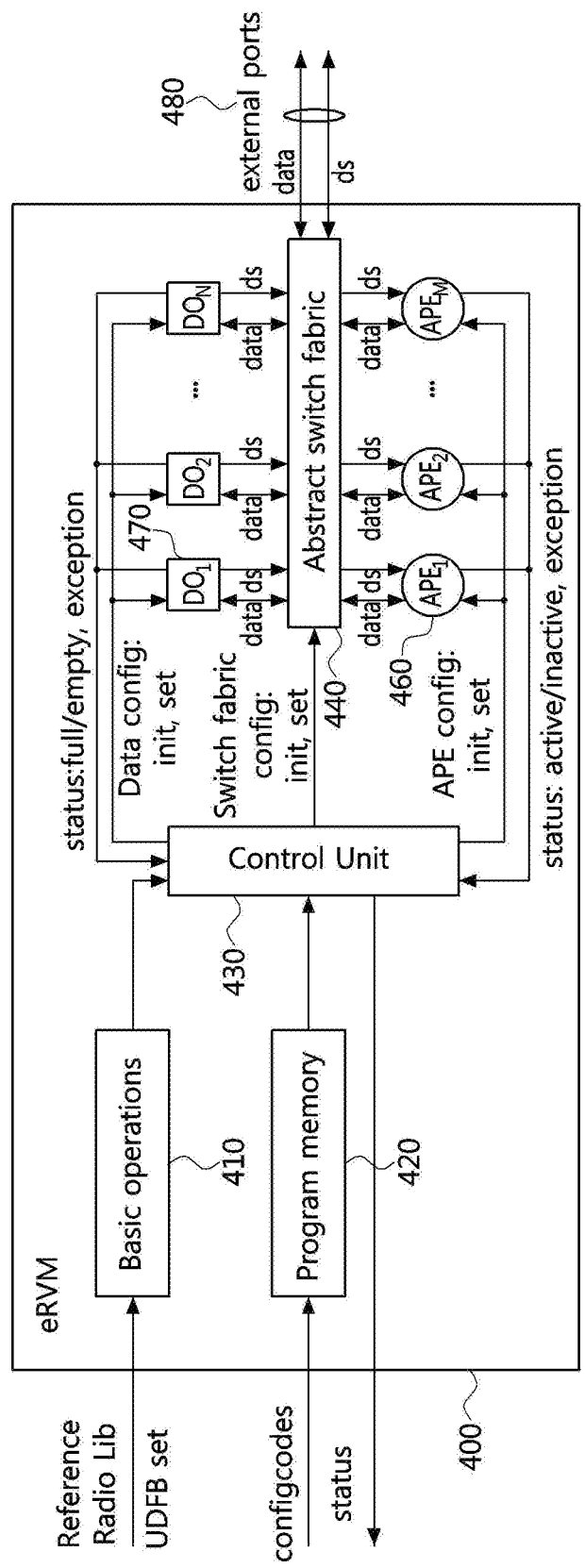
FIG. 6 is a conceptual diagram illustrating element radio virtual machine (eRVM) according to an embodiment of the present invention.

Therefore, as shown in FIG. 6, in the present embodiment, the UDFB 516 may be processed using the eRVM 490 included in the RVM hierarchy if the UDFB 516 exist. The UDFB 516 may be downloaded to basic operations 410 via eRVM Configcodes.

FIG. 6 is a conceptual diagram illustrating element radio virtual machine (eRVM) according to an embodiment of the present invention.

Referring to FIG. 6, an elementary RVM (eRVM) 400 according to the present embodiment may include data objects (DOs) 470, abstract processing elements (APEs) 460, an abstract switch fabric (ASF) 440, and a control unit (CU) 430. The eRVM 400 may not include another eRVM or RVM 490.

The basic operation is a standard functional block (SFB) 517-1 to 517-M and a UDFB 516 defined in a specific radio application package (RAP), and may include operator received from a reference radio library.

A program memory 420 may include configuration code for determining a configuration of the eRVM 400. The control unit 430 may create initialization and set-up instructions for the APEs 460, the DOs 470, and the ASF 440 based on a decoding configuration code stored in the program memory 420.

The ASF 440 may be connected to APEs 460 and DOs 470 according to a signal of the CU 430. One DO 470 may be connected to multiple APEs 460. One APE 460 may be connected to multiple DOs 470. A DO form other eRVMs may be connected to ASF 440 via an external data port 480.

As shown in FIG. 6, the basic operation in the eRVM 400 may be configured as an operation downloaded from a radio library 514 or the UDFB set 450. The basic operation may include only SFB 517-1 to 517-M or UDFB 516. The eRVM may be independent of a platform. The granularity of SFB loaded into each APE 460 may be all different from one another since the basic operation corresponds to the radio library 514.

The control unit (CU) 430 performs a function of determining the behavior of the DO 470, the APE 460, and the ASF 440 in accordance with a configcode (IR or RA code in the form of source code). The time at which the APE 460 is connected to data may be determined by the CU 430 and the time at which each APE 460 is activated may be determined. For the above determining, the CU 430 may obtain time information from metadata 513 in the configcode. The APE 460 may be automatically initialized when data entry is performed. The degree of partitioning of the operations provided in each APE 460 may be all different depending on a hardware platform executing the configcode.

The data object (DO) 470 is an abstract resource for abstracting a memory. In other words, it may be an abstract memory concept for storing intermediate data required in the process of transmitting/receiving data.

The abstract processing element (APE) 460 is an abstraction resource for abstracting different hardware resources according to a platform of a terminal device.

In other words, it may be an abstract computational element concept capable of processing by the basic operations 410, a SFB and a UDFB, downloaded from a radio library 514 or a UDFB set 450 in a platform specific hardware resource determined as a predetermined platform. The abstract switch fabric (ASF) 440 is an abstract switch concept for connecting the DO 470 and the APE 460.

The basic operations 410 may be functional block(s) that may be processed in the RVM. In other words, it may be a SFB and a UDFB in the elementary radio virtual machine (eRVM) 400 (see FIG. 6) and a SFB and a UDFB in the radio virtual machine (RVM) 515 (see FIG. 5).

The program memory 420 may be a memory capable of storing a configcode, that is, a radio application code (RA Code) in the form of an intermediate representation (IR) or a source code.

Meanwhile, the basic operation in the eRVM may be configured to operations downloaded from a reference radio library 220 and a UDFB set 450. Each of UDFBs in a predetermined radio application package (RAP) may be mapped to a corresponding eRVM or RVM layer when the basic operation receives SFBs only in the reference radio library 220.

Figure 7:
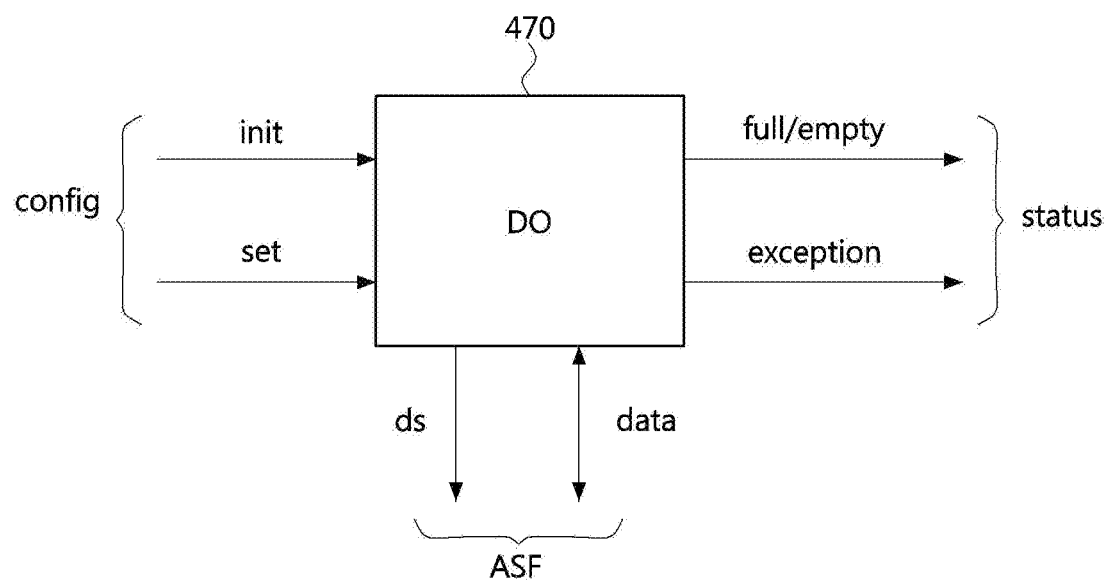
FIG. 7 is a conceptual diagram illustrating a data object and an interface of the data object.

FIG. 7 is a conceptual diagram illustrating a data object and an interface of the data object.

Referring to FIG. 7, a data path of an eRVM may be configured to the following blocks.

Data object
APEs
ASF

Each data object 470 may have a unique number. For this purpose, DOs 470 may be represented as a data object 1 ($DO_1$), a data object 2 ($DO_2$), . . . , a data object N ($DO_N$). The N may be a sufficiently large number.

Referring to FIG. 7, each data object 470 may include an initialization field for initializing a data object according to a specific initialization procedure (depending on implementation) and a set field configured for configuration settings such as instructions setting up data object attributes such as a data object identification (ID), access time, and size, etc.

A configuration to communicate between a DO 470 and APEs 460 through an ASF interface may include a data status signal indicating whether the DO is full or empty and data lines for transmitting or receiving data between the DO 460 and the APEs 460 to each other to read or write the data.

A status interface may provide a CU 430 with status information of the data object 470, and may include full/empty unit describing whether the DO 470 is full or empty and exception unit describing a reason of fail when the APE 460 operates with the DO 470.

Figure 8:
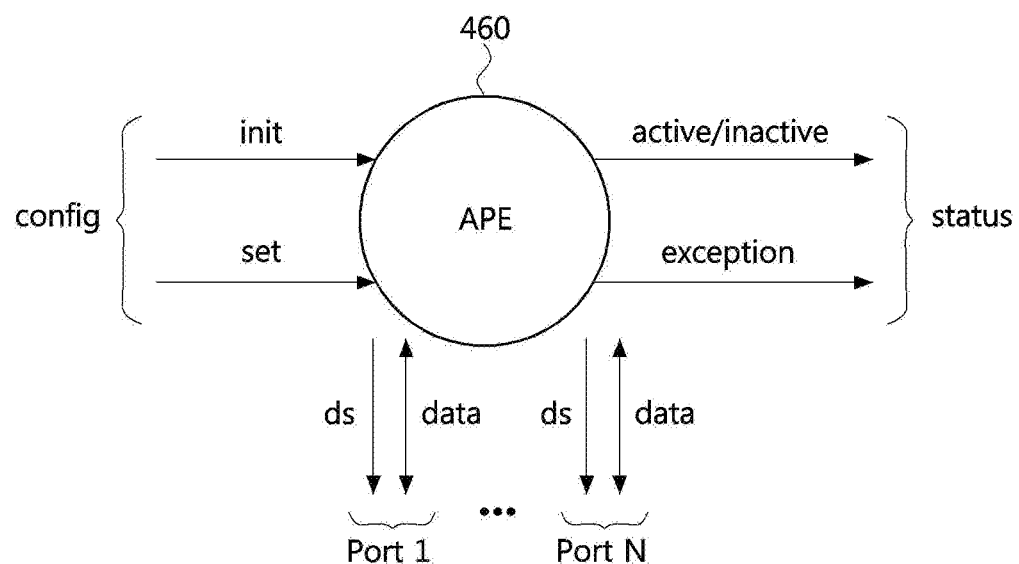
FIG. 8 is a conceptual diagram illustrating an abstract processing element (APE) and an interface of the APE.

FIG. 8 is a conceptual diagram illustrating an abstract processing element (APE) and an interface of the APE.

Each APEs 460 may have a unique number. For this purpose, APEs 460 may be represented as an abstract processing element 1 ($APE_1$), an abstract processing element 2 ($APE_2$), . . . , an abstract processing element N ($APE_N$). N may be a sufficiently large number.

Referring to FIG. 8, the APEs 460 may include an initialization field for bringing an op code operation from basic operations and a set field configured for configuration settings such as instructions setting up APEs such as a data port number, a port type, an execution cost and time, etc.

An APE port may be connected to an APE 460 and an ASF 440, Also, the APE port may include a data interface. The data interface may include a data status signal indicating whether a data object is full or empty and data lines for reading or writing data through the ASF 440.

A status interface may provide a CU 430 with status information of the APE 460, and may include active/inactive unit describing whether a status of the APE 460 is active or inactive and exception unit describing a reason of fail when an error occurs in operation of APE 460.

The APE 460 may be activated when an input data object 470 is consumed and the input data object 470 is processed. The APE 460 may change a corresponding indication for the CU 430 to inactive state immediately after processing all data associated to the APE 460.

Figure 9:
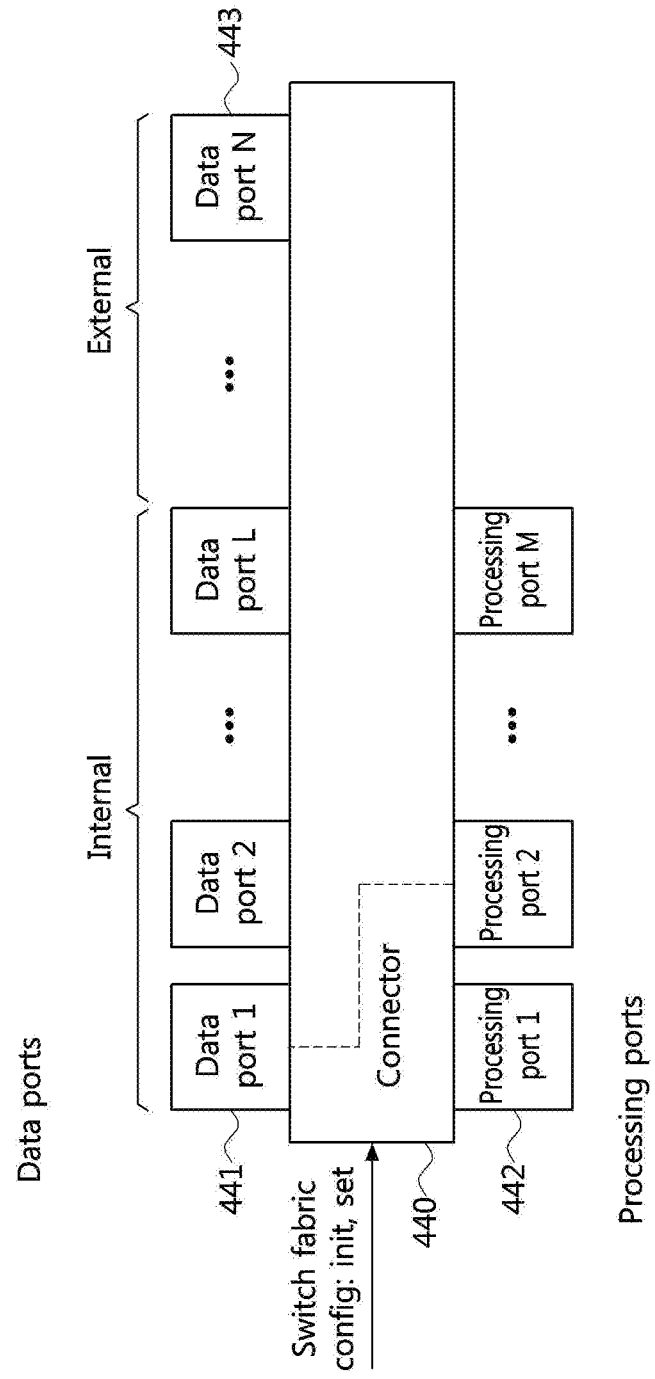
FIG. 9 is a conceptual diagram illustrating an abstract switch fabric.

As shown in FIG. 9, the ASF 440 may be connected to the APEs 460 and the data objects 470. One data object 470 may be connected to multiple APEs 460. One APE 460 may also be connected to multiple data objects 470.

FIG. 9 is a conceptual diagram illustrating an abstract switch fabric.

Referring to FIG. 9, the ASF 440 may be connected to DOs 470 and APEs 460 through ports, and the ports may include an internal data port 441 connecting the ASF 440 to the DOs 470 via interface lines, an external data port 443 connecting the ASF 440 to $D_{OS}$ from other eRVM or RVM, and a processing port 442 connecting the ASF 440 to the APEs 460 via interface lines.

Each connector of the ASF 440 may connect a port with a boundary of a DO and a port with a boundary of an APE to the ASF 440. The each connector may use the same interface lines as ports do, i.e. data status, data.

The connector may provide interface value between ports when they represent in corresponding ports. The CU 430 may configure the ASF by an interface. The interface may include an initialization unit for connecting the ports to the DOs 470 and the APEs 460 and setting unit for creating connection unit and a port between the ports.

Figure 10:
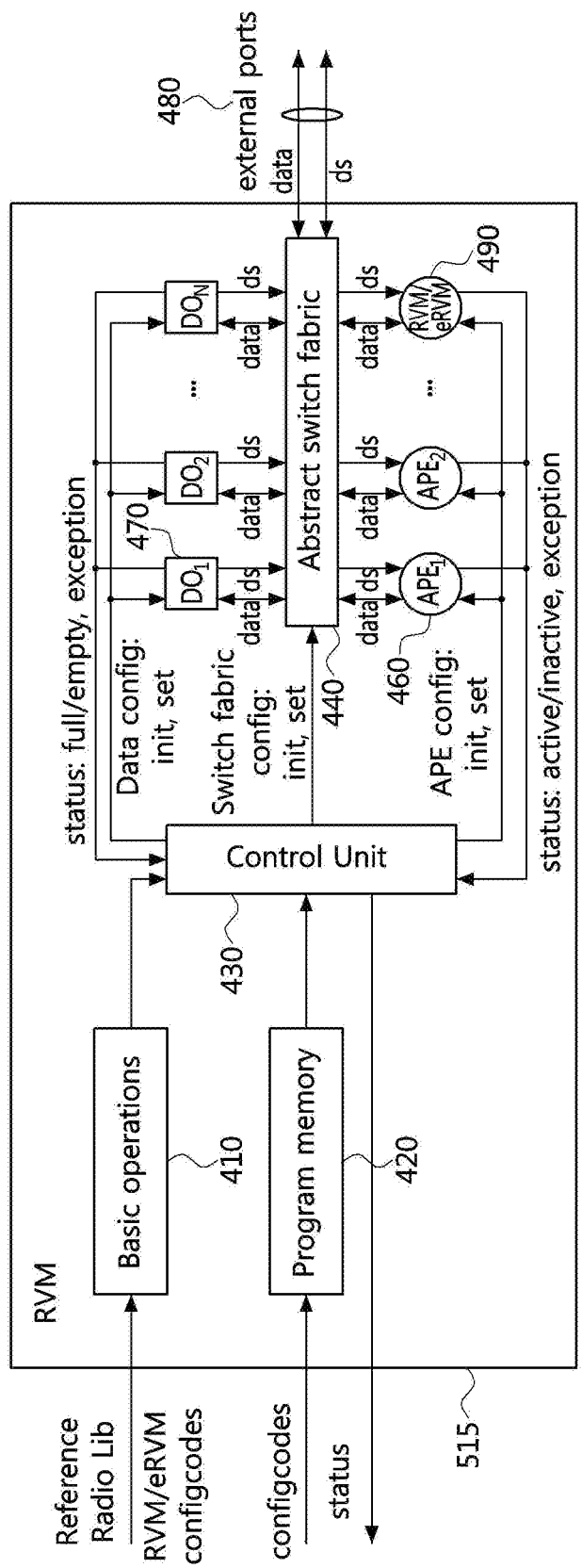
FIG. 10 is a conceptual diagram illustrating RVM hierarchy.

FIG. 10 is a conceptual diagram illustrating RVM hierarchy.

FIG. 10 may represent RVM hierarchy including an APE 460, a DO 470, a basic operation 410, a program memory 420, a control unit (CU) 430, an abstract switch fabric (ASF) 440 and eRVM(s)/RVM(s) 490. The RVM may include other eRVM(s) and RVM(s).

The CU 430 of FIG. 10 may connect the DO 470 to correspond to the APE(s) 460 through the ASF 440. However, in this case, data may be connected to the eRVM and the RVM 490 as well as the APE 460. The basic operations may receive SFBs only from a reference radio library 220 and each UDFB 516 in a given RAP 510 may be mapped to a corresponding eRVM/RVM. Also, the RVM layer may include the eRVM/RVM corresponding to the downloaded UDFBs. Each UDFB 516 may be represented as a combination of SFBs. Some UDFB 516 may be represented as a combination of SFB.

The RVM 515 may be scalable vertically and horizontally. As for the vertical scaling, since each eRVM may include a exactly specific data flow chart, i.e., a specific algorithm, for building RVM hierarchy, the APE 460 may include another eRVM and RVM executing another specific data flow chart.

As for the horizontal scaling, several radio virtual machines (RVMs) may be arranged on the same level. The horizontally arranged RVMs may require to be independent. The requirement for independence may mean that fully independent processing are executed in parallel.

Figure 11:
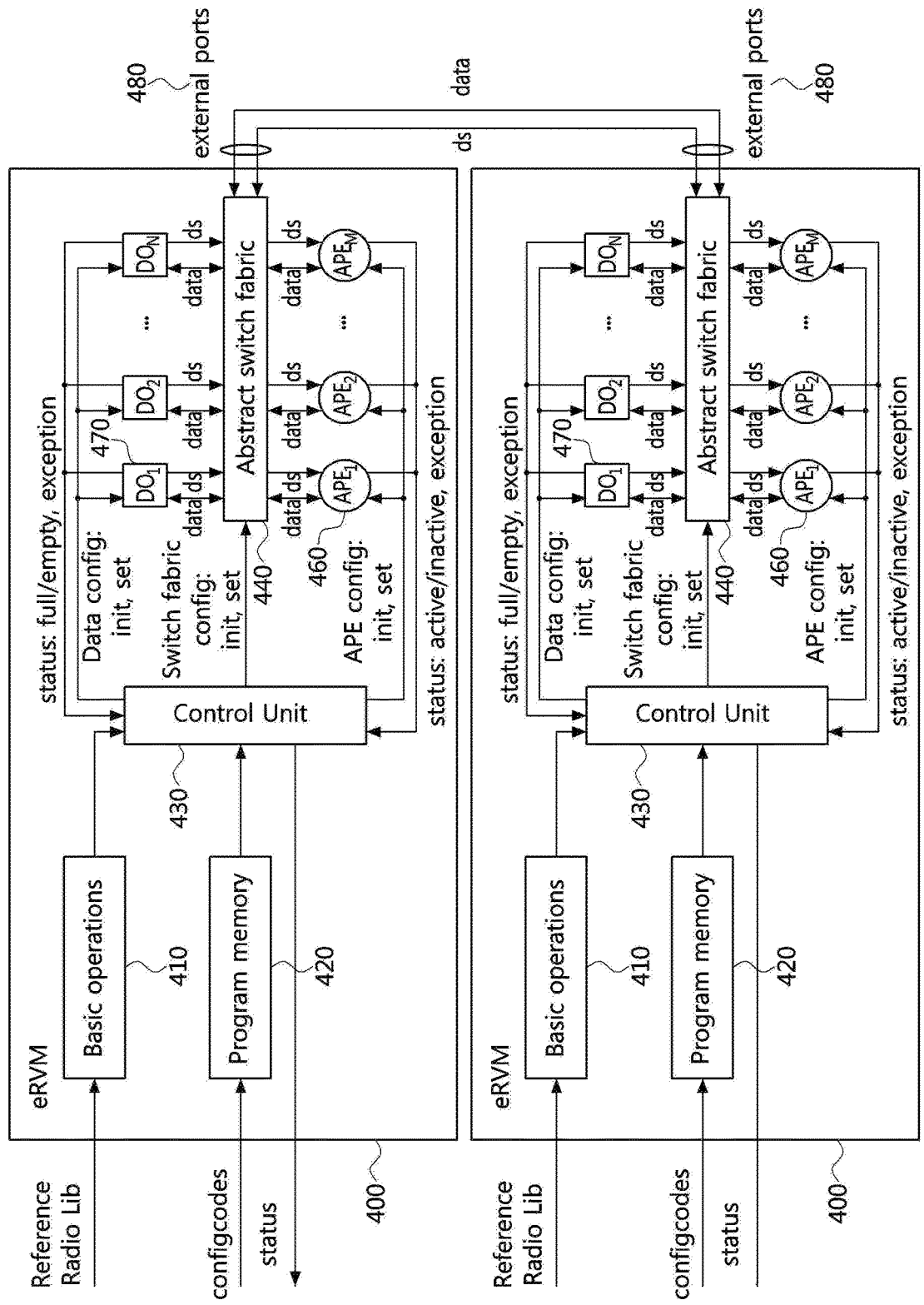
FIG. 11 is a conceptual diagram illustrating horizontal expansion of eRVM.

FIG. 11 is a conceptual diagram illustrating horizontal expansion of eRVM.

Referring to FIG. 11, there may be no types. DOs 470 may be tokens with some size in bytes and bits. Full DOs 470 may be treated as a bit field. A structure of a DO may be recognized by an initialized APE.

Run-Time Data

The following runtime data may be considered:

Configuration code counter registration: Positive 32 bit integer may be registered.

Constant data object: The dynamic bit field may exist only during the execution of the task. The dynamic bit field may be initialized by some external agent.

Intermediate data object: The dynamic bit field may exist only during the execution of a task. The dynamic hit field may be initialized by an intermediate value created as a corresponding result value in the APE operation.

Arithmetic may not be fixed. However, arithmetic may be defined by operation from a basic operation set.

Two types of exceptions may exist.

Table 1 may be referenced when generated by a data object 470.

TABLE 1

| Value | Semantic |
|---|---|
| 00 | No exception |
| 01 | Operation with size > DO size |
| 10 | Conflicting writes |
| 11 | Conflicting read-erase operations |

Table 1 is a table showing an exception of the data object 470.

Table 2 may be referenced when generated by an APEs/(e)RVMs.

TABLE 2

| Exception | Semantic |
|---|---|
| 00 | No exception |
| 01 | Change CC flow |
| 10 | Arithmetic overflow/underflow |
| 11 | Incorrect operation (operation is carried out on data where the operation is not defined) |

Table 2 is a table showing an exceptions of the APEs 460 and the (e)RVMs 490. In Table 2, CC represents Configcodes Count.

Control, Synchronization, and Execution

Control may be data-driven only.

An execution by an APE 460 may be performed in the following cases:

All input data objects are configured and full in case of terminal operations.

All input data objects are configured and some of all input data objects are full in case of nonterminal operations.

An APE is configured.

An APE is connected with configured data objects.

After an APE 460 is configured, some output data objects 470 of the APE 460 may be empty while the APE 460 is executing its operation. A task of execution may be not instantanous and may have some finite time. An operation on all data paths may be synchronous and asynchronous.

A CU 430 may not directly manage a task execution.

A CU 430 may execute the following operations:

Configure all data path elements before configuration code execution,

Receive status signals from all data path elements during task execution,

Detect an end of each configuration code.

Detect a last configuration code in the task,

Stop ab execution in case of any exception.

Operations with Memory

The memory may be flat and infinite.

Its implementation is beyond the scope of the present document.

Any RVM may access memory.

Data objects 470 may be allocated in memory during their configuration. The memory may allow for multiple parallel read and write operations. Conflicting operations may enforce exceptions. Attempts to write more data than an allocated data object memory may enforce exceptions. During a specific memory operation, an entire data object 470 may be consumed.

RVM for Executable Code Distribution

In this case, a RVM only includes component that controls execution.

Figure 12:
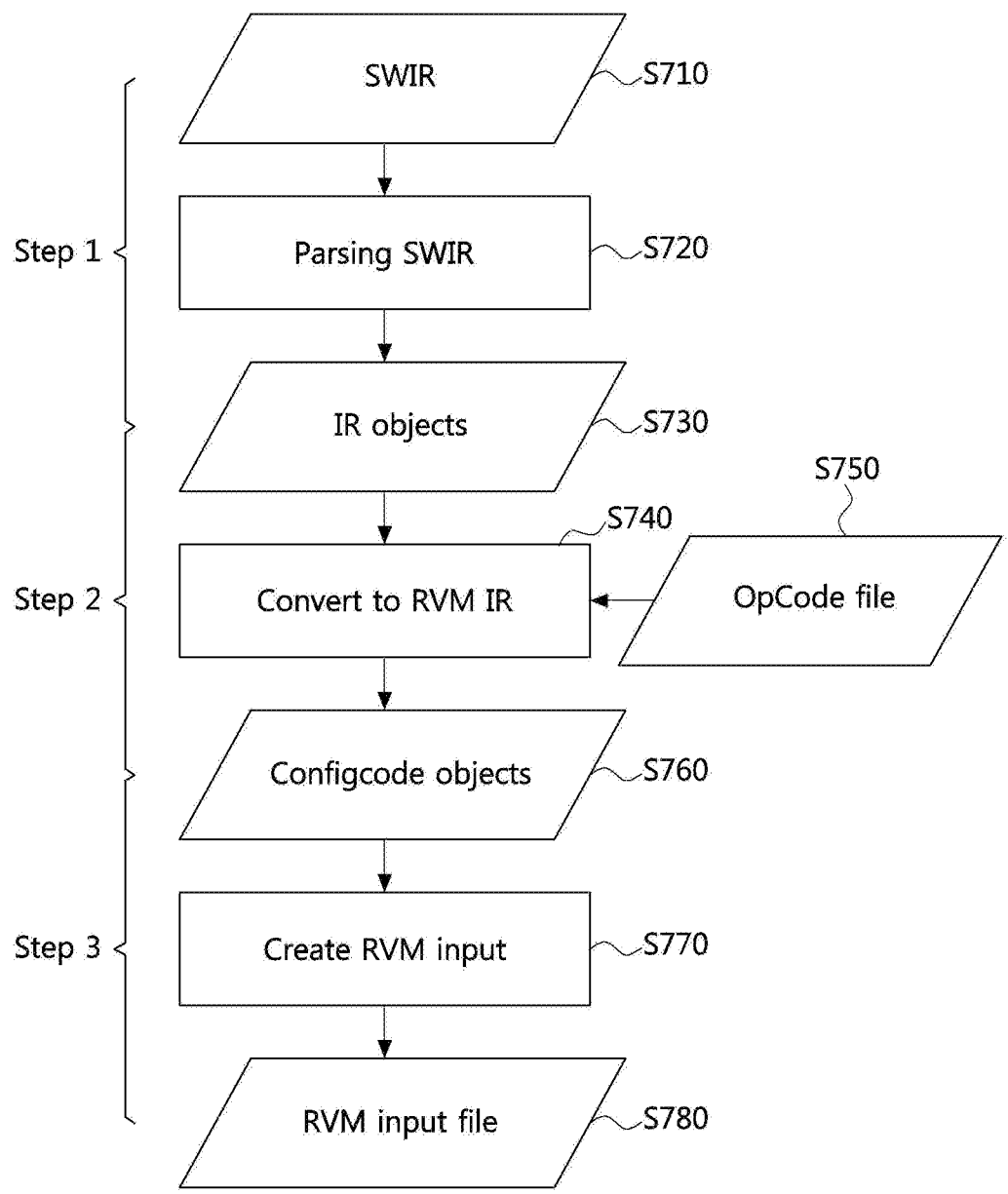
FIG. 12 is a flowchart of a processing method for creating RVM input data.

FIG. 12 is a flowchart of a processing method for creating RVM input data.

Referring to FIG. 12, a description of configuration codes for the radio virtual machine 515 (Configcodes for RVM) is provided. Hereinafter, how a configuration code is generated as a result of front-end compilation of software intermediate representation (SWIR) during a design period of radio application (RA) distribution will be described.

The configuration code is generated in binary or extensible markup language (XML) according to a vendor's choice. The radio virtual machine 515 converts the configuration code into a proper form for a back-end compiler to generate executable code.

Generation of Configuration Code

How the configuration codes are generated in XML or binary format will be described below, whereafter the XML or binary format may be referred to as the RVM input file. FIG. 12 illustrates processing steps for generating a configuration code from corresponding SWIR.

The configuration code generation processing shown in FIG. 12 starts from the SWIR configured for an algorithm of the given RA code. The SWIR is generated by a parallelizing procedure of a given RA code created in a high-level language, for example, C, C++, and Pascal, etc. An operation of the SWIR is based on the data-driven mechanism described above. A method of converting the SWIR to the corresponding configuration code may include the following three steps.

Step 1: Parsing SWIR file

Input SWIR file (S710)

Output: Intermediate Representation (IR) objects (S730) configured for terminal objects and links connecting the terminal objects Action: Parsing SWIR file and creating IR objects configured for sections and links (S720)

Step 2: Mapping IR objects into Configcodes objects

Input: List of IR objects (S730)

Outputs: Configcodes objects each of which represents one configuration determined by terminal operators, APE, DO, and switch configurations and text file with OpCode specifying an implemented data flow chart (S760)

Action: It is converted from IR data format to configcodes format (S740). At this time, all configurations of the configcodes in the task are determined by parameters for APE, DP, and Switch.

The OpCode is created to match between a name of each implemented function and corresponding OpCode (S750).

Step 3: Create of input file for RVM

Input: Configcodes objects (S760)

Output: RVM input file (S780)

Action: Creation of RVM input file from configcodes objects (S770)

Figure 13:
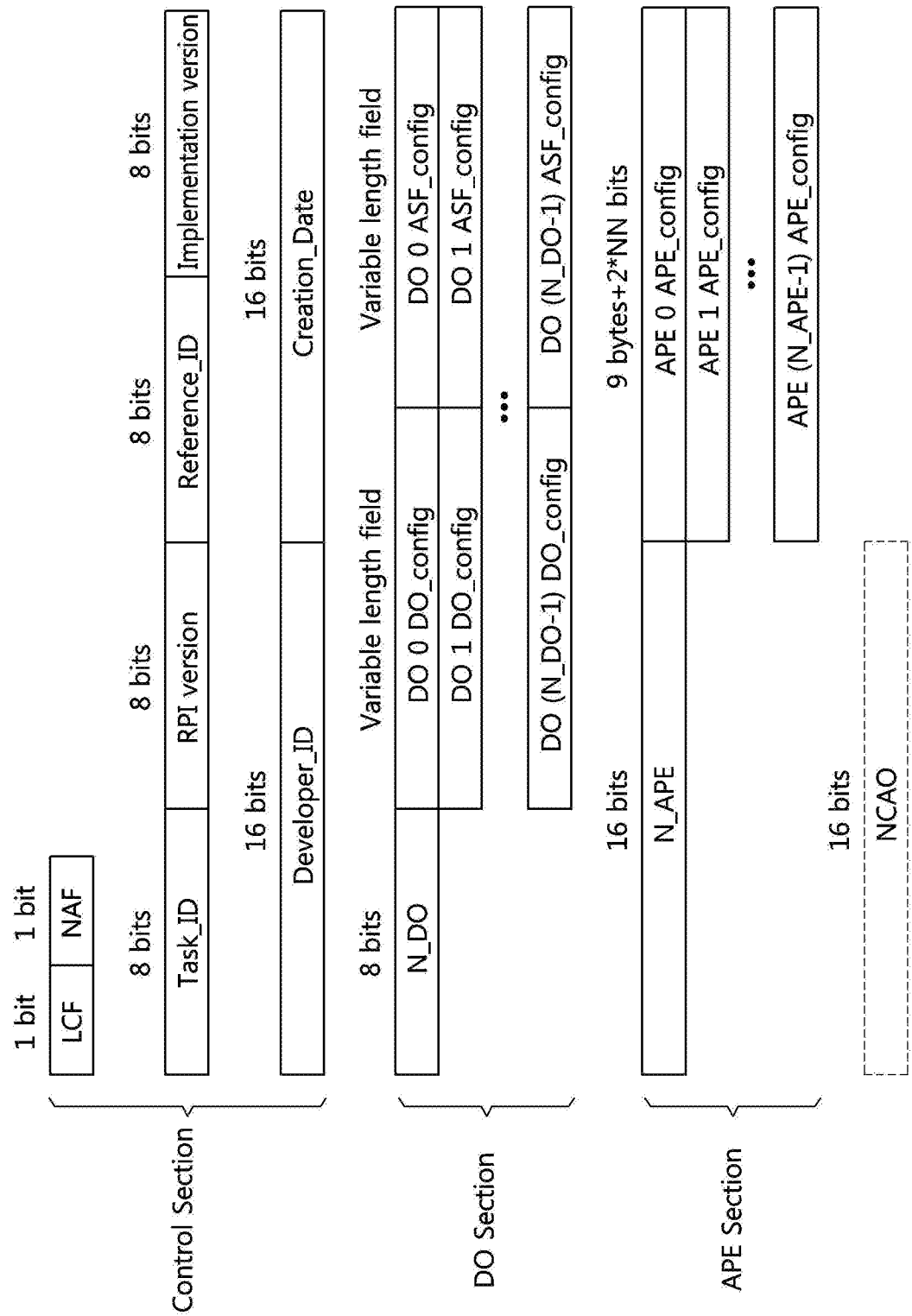
FIG. 13 is a conceptual diagram illustrating a binary format for a configuration code.

FIG. 13 is a conceptual diagram illustrating a binary format for a configuration code.

Referring to FIG. 13, Formats of RVM input files may be various, and in particular, XML or binary format may be taken into consideration in the present invention. Examples of configuration codes defined in XML or binary format be described above.

Binary Format for Configuration Codes

A binary format for configuration codes is described below. Each task includes at least one configuration code. Each configuration code includes a control configuration code, a data object configuration code, an APE configuration code, an ASF configuration code, and an additional next configuration code address offset (NCAO).

A NCAO field is incremented if NAF=1. A binary format of the configuration code is shown in FIG. 13, and includes the following elements. The control section provides general information related to a task and includes the following elements:

LCF: 1 bit, LCF=1 indicates that this is the last contigcode in the task.

NAF: 1 bit, NAF=1 indicates that the NCAO field is incremented for this configuration code.

Task_ID: 8 bits, Task_ID is an automatically generated identifier of this task.

RPI version: 8 bits, RPI version is a version number of supported RPI.

Reference_ID: 8 bits, Reference_ID is a SFB identifier of the reference radio library.

Implementation Version: 8 bits, implementation version is a version number of an implemented task.

Developer_ID: 16 bits, Developer_ID is an identifier of the developer who creates the current task.

Creation_Date: 16 bits, Creation_Date is a date of a task creation.

A data object section provides general information related to a data object and includes the following elements.

N_DO: 8 bits, the number of DOs related to a configuration code

N_DO particular DO configuration fields:

DO_config is a specific data object configuration code

ASF_config is an ASF configuration code without a data object field

An APE section provides general information related to an APE configuration and includes the following elements:

N_APE: 16 bits, the number of APEs related to a configuration code

N_APE particular APE configuration fields

APE configuration field is specific APE configuration code

Figure 14:
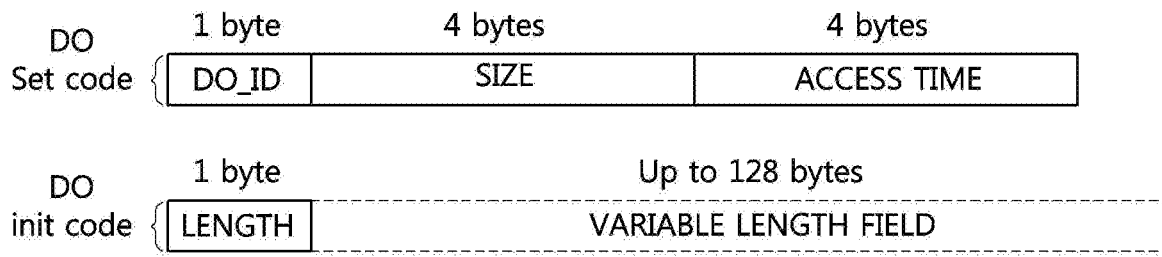
FIG. 14 is a conceptual diagram illustrating a configuration code format of a specific data object.

FIG. 14 is a conceptual diagram illustrating a configuration code format of a specific data object.

Referring to FIG. 14, the format of a specific data object configuration code includes two parts, one is a fixed length field of a data object set code and the other is a variable length field of a data object initialization code. This configuration is shown in FIG. 15.

Figure 15:
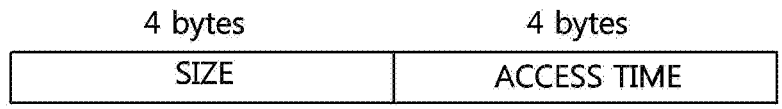
FIG. 15 is a conceptual diagram illustrating a format of a set code of a data object.

FIG. 15 is a conceptual diagram illustrating a format of a set code of a data object.

Referring to FIG. 15, a data object set code may include the following elements as shown in FIG. 15, Size: A positive integer representing the data object size in bytes.

Access Time: A positive integer representing the access time in ns.

A set instruction, Set(YYYY ZZZZ), for setting data object attributes is generated. Here, YYYY is the size in bytes and ZZZZ is the access time in ns.

Figure 16:
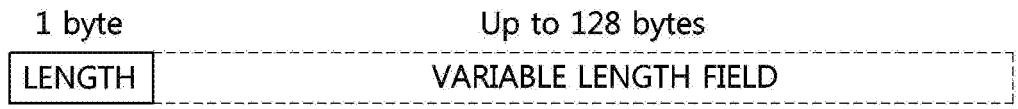
FIG. 16 is a conceptual diagram illustrating a format of an initial code of a data object.

FIG. 16 is a conceptual diagram illustrating a format of an initial code of a data object.

As shown in FIG. 16, a data object initialization code (Init Code) may include the following elements.

Length: 1 byte, Length is indicates a length of variable part of a field in bytes.

Variable Length Field: Variable length field is represented up to 256 bytes, and bring immediate values.

Figure 17:
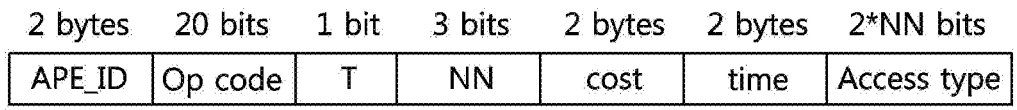
FIG. 17 is a conceptual diagram illustrating a format of an APE configcode.

FIG. 17 is a conceptual diagram illustrating a format of an APE configcode.

Referring to FIG. 17, the Init field initializes a data object 470 according to a specific initialization procedure (depending on implementation), and make the data object full after initialization if Length=0, i.e., Init (XXXX), where XXXX is a bit field. The Init field may be empty if Length=0, in which case the data object 470 is empty.

As shown in FIG. 17, the abstract processing element configuration code (APE Configcode) may include the following elements.

APE_ID: 2 bytes, the number of APEs

Op Code: 20 bits, operation code from Basic Operations 410

T: 1 bit flag, T indicates that the APE is inactive immediately after completion of an operation when T=1 for dynamic operations, and the APE is active even after completion of an operation when T=0 for static operations.

NN: 3 hits, number of ports

Cost: 2 bytes, Execution cost value

Time: 2 bytes, Time Constraint Value

Port access type: 2 bits per port, port access type describes access type {r, re, w, rew}.

Figure 18:
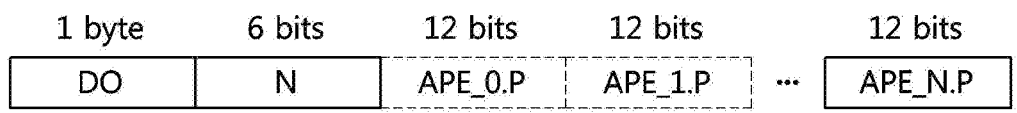
FIG. 18 is a conceptual diagram illustrating a format of an abstract switch fabric (ASF) configcode.

FIG. 18 is a conceptual diagram illustrating a format of an abstract switch fabric (ASF) configcode.

Referring to FIG. 18, the APE 460 is configured by an instruction APE_config(APE_Port_ID, Init, Set) with an Init field, a Set field, and an APE_Port_ID field.

The APE_Port_ID field has an identifier APE_Port_ID (XXXX.YY, PORT_TYPE), where XXXX=APE_ID, YY is the number of APE ports, and PORT_TYPE={r, re, w, rew}.

The Init field brings an operation identifier from the set of basic operations 410 and a port configuration. During a configuration procedure, the APE 460 is bound with Op operation from the basic operation using Init(op). Input and output parameters of the operation are bound to APE ports of corresponding access types.

The Set field sets the APE attributes using Set(NN, PP, XXXX, YYYY, ZZZZ) where NN is the number of ports in decimal, PP is a field defining port type and XXXX is an execution cost in decimal, YYYY=0 indicates no cost, ZZZZ indicates time in ms (decimal), and ZZZZ=0 indicates no time limit.

When the AP_configuration procedure is successfully completed, the APE 460 converts to activate state, informs it to a CU 430, and expects values in line data status (DS) and data.

An APE 460 exception codes are shown in Table 3.

TABLE 3

| Exception | Semantic |
| --- | --- |
| 00 | No exception |
| 01 | Change configcodes count (CC) flow |
| 10 | Arithmetic overflow/underflow |

Table 3 is a table representing exceptions of an APE 460.

FIG. 18 is a conceptual diagram illustrating a format of an abstract switch fabric (ASF) configcode.

As described above, ports connect an ASF 440 with data objects 470 or APEs 460. The connectors of the ASF 440 connect the ports bound to the data object 470 with the ports bound to the APE 460.

Each connector has the same interface lines (DS, Data) as the ports. The connectors convey interface values between the ports when they appear in corresponding ports.

The ASF_config code shown in FIG. 18 includes the following elements.

DO: 1 byte field, a data object number
N: 6 bits, the number of APEs connected with a data object
APE_KP: 12 bits, where K runs from 0 to N−1,
APE_K: 8-bit, an APE number
P: 4-bit, a port number.

The ASF 440 is configured by an instruction ASF_config (Set, Init) with a Set field and an Init field.

The Set field sets ASF attributes using Set(DO, N) where the DO is the number of a data object 470 and N is the number of APEs 460 connected with the data object.

The Init field initializes the ASF 440 using Init (APE_K.P), where APE_K (K changes from 0 to N−1) is an APE number, and P is a port number.

After configuration, the connectors immediately convey interface values to data objects 470 and APEs 460.

Figure 19:
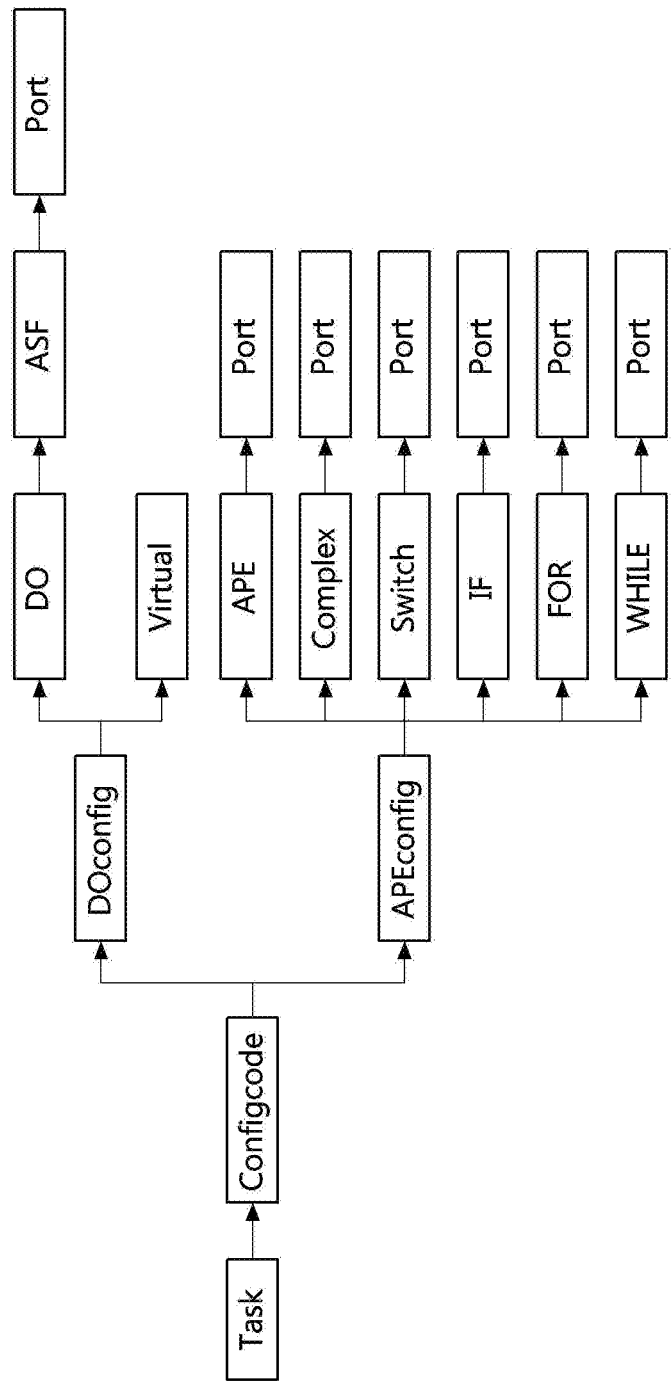
FIG. 19 is a block diagram illustrating XML elements comprising configuration codes.

FIG. 19 is a block diagram illustrating XML elements comprising configuration codes.

Referring to FIG. 19, an XML schema for a configuration code is described. Each task includes at least one configuration code. XML elements are as follows.

Task; Configuration code (Configcode); DOcontig; DO; ASF;
Virtual; APEconfig; APE; Complex; FOR; SWITCH; IF; WHILE; Port Table 4 to Table 17 represent attributes of each element shown in FIG. 19.

Element/Task
Parent Element: Document Root
Children:
<Configcode>
<Task> is the root element of xml.

TABLE 4

| Attribute | Description |
| --- | --- |
| TaskID | Task identifier. |
| RPIVersion | Version of RPI. |
| DeveloperID | Developer identifier. |
| CreationDate | Date of task creation. |
| ReferenceID | SFB identifier of reference Radio Library. |
| TaskImpVersion | Task implementation version. |
| num | Contain number of configurations in the task. |

Table 4 is a table representing attributes of task.
Element/Task/Configcode
Parent: <Task>
Children:
<DOconfig>
<APEconfig>
<Configcode> is a tag for one configuration in a task.

TABLE 5

| Attribute | Description |
| --- | --- |
| LCF | Last Config Flag. Identify last configcode in the task |
| ID | Automatically generated identifier. |

TABLE 5-continued

| Attribute | Description |
| --- | --- |
| NDO | Number of data objects in the configuration. |
| NAPE | Number of APE in the configuration. |

Table 5 is a table representing attributes of a configcode.
Element/Task/Configcode/DOconfig
Parent: <Configcode>
Children:
<DO>
<Virtual/>
<DOconfig> is a tag for data objects configurations.
Element/Task/Configcode/DOconfig/DO
Parent: <DOconfig>
Children:
<ASF>
<DO> is a tag for configuration of one data object.

TABLE 6

| Attribute | Description |
| --- | --- |
| ID | Automatically generated identifier. |
| Size | Size of data object. |
| AccT | Accesses time of data object. |
| Length | Length of initial data in object. |
| Data | Initial data. |

Table 6 is a table representing attributes of a data object.
Element/Task/Configcode/DOconfig/DO/ASF
Parent: <DO>
Children:
<Port>
<ASF> is a tag for configuration of an abstract switch fabric (ASF) for DO.

TABLE 7

| Attribute | Description |
| --- | --- |
| APENum | Number of APE connected to data object. |

Table 7 is a table representing attributes of an ASF 440.
Element/Task/Configcode/DOconfig/DO/ASF/Port
Parent: <ASF>
Children: None
<Port> is a tag for a switch port.

TABLE 8

| Attribute | Description |
| --- | --- |
| APEid | APE identifier. |
| PortId | Port identifier. |

Table 8 is a table representing attributes of a port.
Element/Task/Configcode/DOconfig/Virtual
Parent: <DOconfig>
Children: None
<Virtual> is a tag for a virtual data object.

TABLE 9

| Attribute | Description |
| --- | --- |
| ID | Automatically generated identifier. |
| Type | Size of data object. |

TABLE 9-continued

| Attribute | Description |
| --- | --- |
| PortRef | Port of the main control operator, to which VDO is connected. |
| InPortRef | Port of the main control operator, which will be the input port for the VDO. |
| OutPortRef | Port of the main control operator, which will be the output port for the VDO. |

Table 9 is a table representing attributes of Virtual.
Element/Task/Contigcode/APEcontig
Parent: <Configcode>
Children:
<APE>
<Complex>
<Switch>
<IF>
<FOR>
<WHILE>
<APEconfig> is a tag for abstract physical elements configurations.
Element/Task/Configcode/APEconfig/APE
Parent: <APEconfig>
Children:
<Port>
<APE> is a tag for configuration of one functional APE.

TABLE 10

| Attribute | Description |
| --- | --- |
| ID | Automatically generated identifier. |
| OpCode | OpCode of implemented function. |
| T | Flag for dynamic operations. |
| Cost | Execution cost value. |
| Time | Time constrain value. |
| PortNum | Number of Switch ports for APE |

Table 10 is a table representing attributes of an APE 460.
Element/Task/Configcode/APEconfig/Complex
Parent: <APEcontig>
Children:
<Port>
<Complex> is a tag for configuration of complex APE.

TABLE 11

| Attribute | Description |
| --- | --- |
| ID | Automatically generated identifier. |
| OpCode | OpCode of implemented function. |
| T | Flag for dynamic operations. |
| Cost | Execution cost value. |
| Time | Time constrain value. |
| PortNum | Number of Switch ports for APE |

Table 11 is a table representing attributes of Complex.
Element/Task/Configcode/APEconfig/FOR
Parent: <APEconfig>
Children:
<Port>
<FOR> is a tag for configuration of FOR-cycle.

TABLE 12

| Attribute | Description |
| --- | --- |
| ID | Automatically generated identifier. |
| Body | ID of cycle body configuration. |

TABLE 12-continued

| Attribute | Description |
| --- | --- |
| T | Flag for dynamic operations. |
| Cost | Execution cost value. |
| Time | Time constrain value. |
| PortNum | Number of Switch ports for APE |

Table 12 is a table representing attributes of FOR.
Element/Task/Configcode/APEconfig/WHILE
Parent: <APEconfig>
Children:
<Port>
<WHILE> is a tag for configuration of WHILE-cycle.

TABLE 13

| Attribute | Description |
| --- | --- |
| ID | Automatically generated identifier. |
| Body | ID of cycle body configuration. |
| T | Flag for dynamic operations. |
| Cost | Execution cost value. |
| Time | Time constrain value. |
| PortNum | Number of Switch ports for APE |

Table 13 is a table representing attributes of WHILE.
Element/Task/Configcode/APEconfig/IF
Parent: <APEconfig>
Children:
<Port>
<IF> is a tag for configuration of IF operator.

TABLE 14

| Attribute | Description |
| --- | --- |
| ID | Automatically generated identifier. |
| Then | ID of body-then configuration. |
| Else | ID of body-else configuration |
| T | Flag for dynamic operations. |
| Cost | Execution cost value. |
| Time | Time constrain value. |
| PortNum | Number of Switch ports for APE |

Table 14 is a table representing attributes of IF.
Element/Task/Configcode/APEconfig/Switch
Parent: <APEconfig>
Children:
<Port>
<Case>
<Switch> is a tag for configuration of Switch-Case operator.

TABLE 15

| Attribute | Description |
| --- | --- |
| ID | Automatically generated identifier. |
| T | Flag for dynamic operations. |
| Cost | Execution cost value |
| Time | Time constrain value |
| PortNum | Number of Switch ports for APE |

Table 15 is a table representing attributes of Switch.
Element/Task/Configcode/APEconfig/APE/Complex-|FOR|WHILE|IF|Switch/Port
Parent: <APE Complex|FOR|WHILE|IF|Switch>
Children: None
<Port> is a tag for an ASP port.

TABLE 16

| Attribute | Description |
| --- | --- |
| ID | Port identifier. |
| AccType | Accesses type. |

Table 16 is a table representing attributes of Port.
Element/Task/Configcode/APEconfig/Switch/Case
Parent: <Switch>
Children: None
<Port> is a tag for a case port of Switch operator,

TABLE 17

| Attribute | Description |
| --- | --- |
| Body | ID of case-body configuration. |
| Condition | Case condition. |

Table 17 is a table representing attributes of Port.

Figure 20:
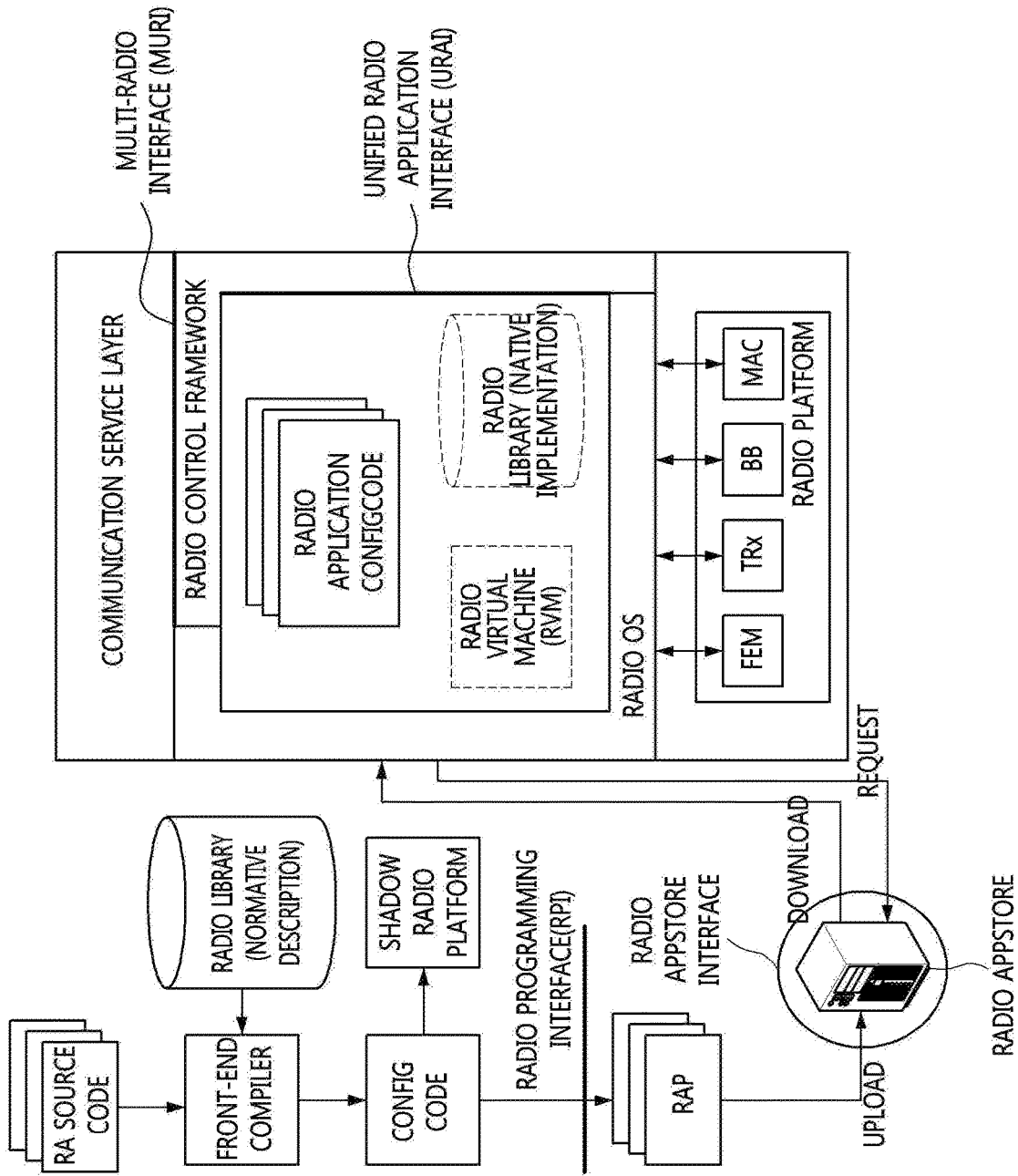
FIG. 20 is a block diagram to explain software architecture of a radio computer in a terminal device of FIG. 2.

FIG. 20 is a block diagram to explain software architecture of a radio computer in a terminal device of FIG. 2.

Referring to FIG. 20, the radio computer provides a mobile device with communication capabilities, and the software architecture for the radio computer may be configured to comprise the following components.
Radio OS
The RP layer part of RCF
Implementation of RVM when the shadow radio platform is RVM.
Native implementation of radio library (Radio Lib) when the shadow radio platform is RVM.
Configuration codes (configcodes) of radio applications configcodes may be provided in form of executable codes of the target radio platform or platform-independent intermediate representation.

The configcodes are interpreted by RWM 515 when the shadow radio platform is equal to RVM, or are equal to executable codes when RVM is equal to the target radio platform.

The RCF 126 and its interfaces such as MUM and URAI have been already explained.

The shadow radio platform can be either RVM 515 or a target radio platform.

If the Shadow radio platform is equal to the target radio platform, then front-end compiler will generate executable code for the target radio platform and configcodes is equivalent to the executable code for that radio platform.

The RVM 515 is an abstract machine which is capable of executing configcodes. It is independent of the hardware. The configcodes are executed on a target platform through a specific RVM. Thus, RVM 515 includes a back-end compiler which might provide Just-in-Time (JIT) or Ahead-of-Time (AOT) method for compilation of configcodes into executable codes.

The radio library 514 comprises functional blocks representing a computational basis. A radio application may be represented as a collection of such interconnected functional blocks. The functional blocks of the radio library 514 are expressed as normative languages. The native implementation of radio library 514 provides executable code for the functional blocks of the library for the target platform. The radio library 514 is extensible.

Operational Structure of Unified Radio Applications
Operational structure of unified radio applications 125 and 450 may be represented considering two different cases. One case is when RA configcodes are executable on a target radio platform (illustrated in FIG. 7) and the other case is when RA configcodes are Intermediate Representation (IR) that is to be back-end compiled at a given mobile device (illustrated in FIG. 8).

Figure 21:
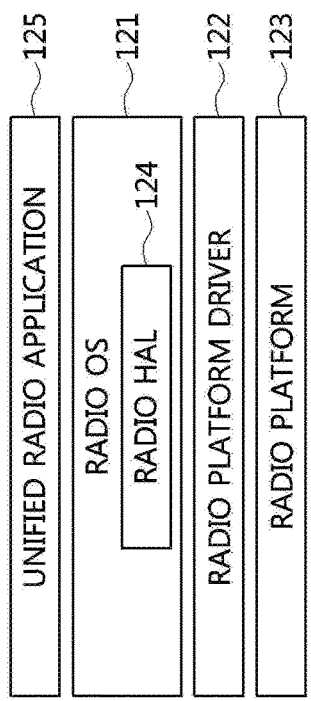
FIG. 21 is a hierarchical structure diagram explaining an example of operational structure of a unified radio application in a terminal device of FIG. 2.

FIG. 21 is a hierarchical structure diagram explaining an example of operational structure of a unified radio application in a terminal device of FIG. 2.

Referring to FIG. 21, a radio library 514 and user-defined function blocks (UDFB) 516 needed for execution of a given RA may be included in executable configcodes of the RA.

Meanwhile, user-defined function blocks 516 needed for execution of a given radio application are included in the configcodes of the radio application, and should be back-end compiled by RVM 515 shown in FIG. 8. In this case, since the radio library cannot be included in the radio application configcodes, a native implementation of the radio library 514 should be additionally prepared in a given mobile device. Usually the native implementation of the radio library 514 is provided by a programmable hardware 123-1 because the radio library 514 includes standard function blocks (SFB) 517-1~M implemented on the programmable hardware 123-1.

The radio library (i.e. native implementation), which can be implemented without hardware accelerator(s) 123-2, are necessary for enhancing speed of the standard function blocks and for generating other standard function blocks by combining accelerator(s) and program codes.

For both a case when the radio application configcodes are executable codes and a case when the radio application configcodes are intermediate representation, the standard function blocks are supported by dedicated hardware logic accelerator(s) 123-2 through the radio hardware abstract layer (HAL) 124. That is, every time when the standard function blocks implemented using dedicated hardware logics are called by given radio application codes, the standard function blocks should be executed on the corresponding dedicated hardware logic accelerator(s) 123-2 through the radio HAL 124, regardless of whether the radio application configcodes are executable codes or intermediate representation.

As explained later, the radio HAL 124 also includes hardware abstraction for interfaces prepared for user-defined function block library(s).

The standard function blocks 517-1~M may be function blocks which are commonly used by various radio applications, for example, a Fast Fourier Transform (FFT) block and/or function blocks which should be efficiently implemented using a special purpose accelerator in a given radio platform, for example, a turbo coder block.

Figure 22:
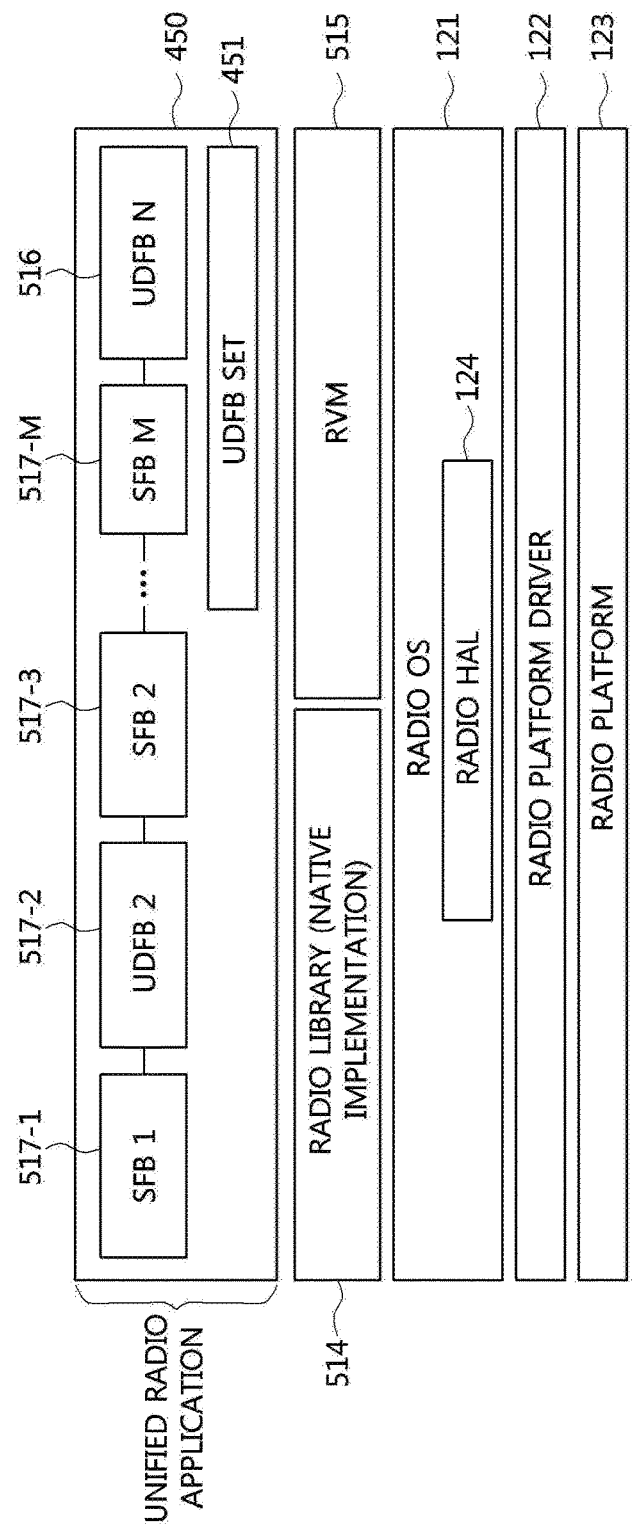
FIG. 22 is a hierarchical structure diagram explaining another example of operational structure of a unified radio application in a terminal device of FIG. 2.

FIG. 22 is a hierarchical structure diagram explaining another example of operational structure of a unified radio application in a terminal device of FIG. 2.

Referring to FIG. 22, the operational structure of unified radio applications may comprise the following components.
The URA 125 includes SFBs 517-1, 517-3, and 517-M and UDFBs 517-2 and 516 in accordance with the contents of metadata 513 in a given RAP 510.
The radio library (native implementation) 514 contains configcodes of SFBs that are to be implemented on programmable hardware 123-1 while the SFBs that are to be implemented using dedicated hardware logic accelerator(s) are supported by Radio HAL 124.
The radio virtual machine (RVM) 515 is a controlled execution environment for software affecting radio characteristics of the terminal device. Using the RVM

515, a situation in which reconfigurable software (i.e. radio application) is loaded to the RVM 515 cats be supposed.

The UDFB set 450 includes all the UDFBs to be used in a given RAP 510 and is in general provided by RA provider. UDFB 516 is included in RAP 510 together with metadata. 513 and RC code 512. Since UDFB 516 is generally a modified and/or extended version of SFB. UDFB 516 may have a dependency on SFB library(-ies).

The radio HAL 124 is to abstract the radio platform 123. The radio HAL 124 supports SFB to be implemented using dedicated hardware accelerator(s) 123-2 in order for each of those SFBs to be implemented directly on corresponding dedicated hardware accelerator(s) 123-2.

The radio platform driver 122 is for the radio OS 121 to recognize the radio platform 123.

The radio platform 123 in general consists of both programmable hardware and hardware accelerator(s).

On the other hand, the above described UDFB set 450 may include all user defined function blocks which are used by given radio application(s). It is important that any standard function block can be modified and/or extended by replacing it with a proper standard function block which is a modified and/or extended version of the standard function block to be replaced.

Therefore, some user-defined function blocks can be good candidates for standard function block extension, which means they might be added as standard function blocks later. In that case, after addition, they will be defined as the normal standard function blocks.

Also, since the user-defined function block Set (UDFB set) 450 is to be provided by radio application provider, i.e. 3rd party, instead of radio platform vendor, in order for radio control framework to be able to perform basic controls of every UDFB's event and/or command, a standard set of control interfaces such as "start", "stop", "pause", "get_port" and "initialize" may have to be specified for the corresponding user-defined function blocks.

The standard set specification of control interfaces for user-defined function block may be given separately. The radio platform 123, shown in FIG. 8 and FIG. 9, may include programmable hardware 123-1 and hardware accelerator(s) 123-2 for implementing each of function blocks.

Figure 23:
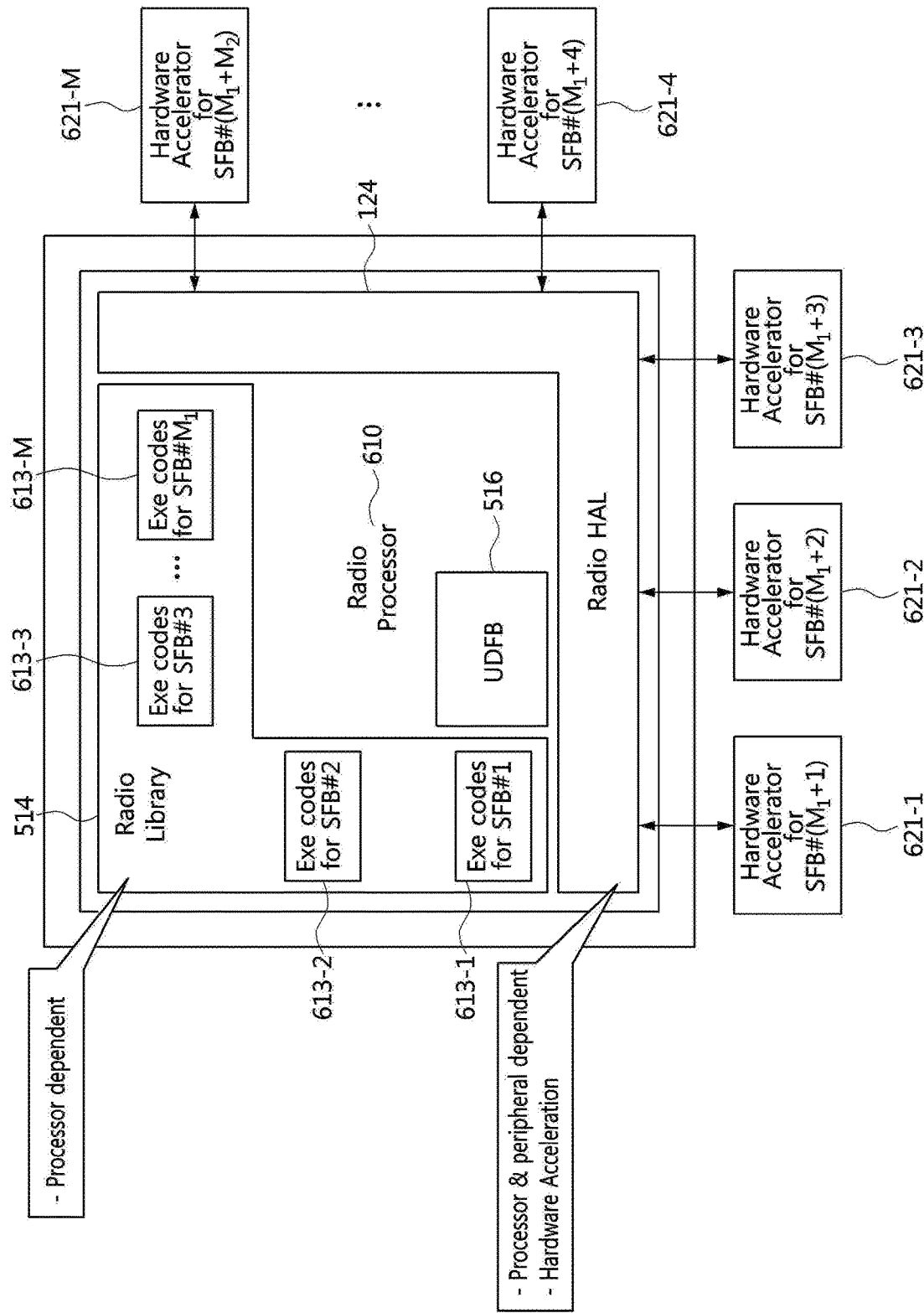
FIG. 23 is a conceptual diagram explaining implementations of function block library of a radio platform of a terminal device of FIG. 2.

FIG. 23 is a conceptual diagram explaining implementations of function block library of a radio platform of a terminal device of FIG. 2.

In an embodiment, functional block implementations of a radio computer 120 comprising a given radio platform 123, comprising a radio processor and various kinds of peripheral devices, are described.

Referring to FIG. 23, standard function blocks implemented on the radio processor 610, for example implemented using dedicated hardware logic accelerator 123-2 such as FFT, Turbodecoder, Multi-Input-Multi-Output (MIMO) decoder, etc. can be implemented directly on the corresponding dedicated hardware logic accelerator for high performance and low power consumption. Those standard function blocks are supported by the radio HAL 124 for implementation on the dedicated accelerator(s).

This means that, when each of standard function blocks to be implemented on the dedicated accelerator is called in a radio application, it is executed directly on the corresponding dedicated accelerator through the radio HAL 124. Similarly, each standard function block executing on a core processor such as bit-reverse, multiply and accumulation, etc. is executed on the given radio processor 610 (e.g. ARM with Neon) when called in a radio application (RA).

Consequently, the execution codes required on a radio processor 610 consists of the following two parts. One part is execution codes for standard function blocks executed on programmable hardware 123-1 and the other part is radio HAL codes for standard function blocks implemented on dedicated accelerators.

This can be summarized as follows. {C: execution code required on RP for SFB implementation}={A: execution codes for SFBs implemented on programmable cores}+{B: Radio HAL codes for SFBs implemented on accelerators}. That is, C=A+B where A and B may be determined by each vendor.

This may also mean that {SFBs} is a union of {SFBs implemented on core processor} and {SFBs implemented on dedicated hardware accelerators}, and an intersection of {SFBs implemented on core processor} and {SFBs implemented on dedicated hardware accelerators} is an empty set.

Meanwhile, UDFB, as mentioned earlier, should be written with standard interfaces. As shown in FIG. 17, it should be observed that the standard interfaces of UDFB might be associated with either SFB(s) implemented on core processor or SFB(s) implemented on dedicated hardware accelerator, or both.

The reason why we classify standard interfaces into two groups, i.e. the one corresponding to SFB(s) implemented on core processor and the other corresponding to SFB(s) implemented on dedicated hardware accelerator, is that each category has its own pros and cons. The latter, since it is implemented on dedicated hardware logic, is advantageous for power consumption, speed-up operation, and, probably, cost-effectiveness.

On the contrary, the former, since it is implemented on microprocessor, is advantageous mainly for flexibility. It is expected that the dedicated hardware accelerator(s) will be used relatively more widely at the beginning stage until programmable devices become competitive to dedicated hardware devices in performance.

As semiconductor technology evolves more and more, the core-dependent SFB will gradually become more and more dominant compared to the core-and-peripheral-dependent SFB in a long term standpoint and be implemented via Instruction Set Architecture (ISA)-level acceleration.

The granularity of the standard function blocks shown in the present specification are just for the purpose of explanation, and the standard function block interfaces may be defined in other documents, as mentioned earlier.

Composition of Radio Application Package (RAP)

Hereinafter, composition of a radio application package (RAP) 510 for distribution of a radio application according to the present invention will be explained in detail.

Figure 24:
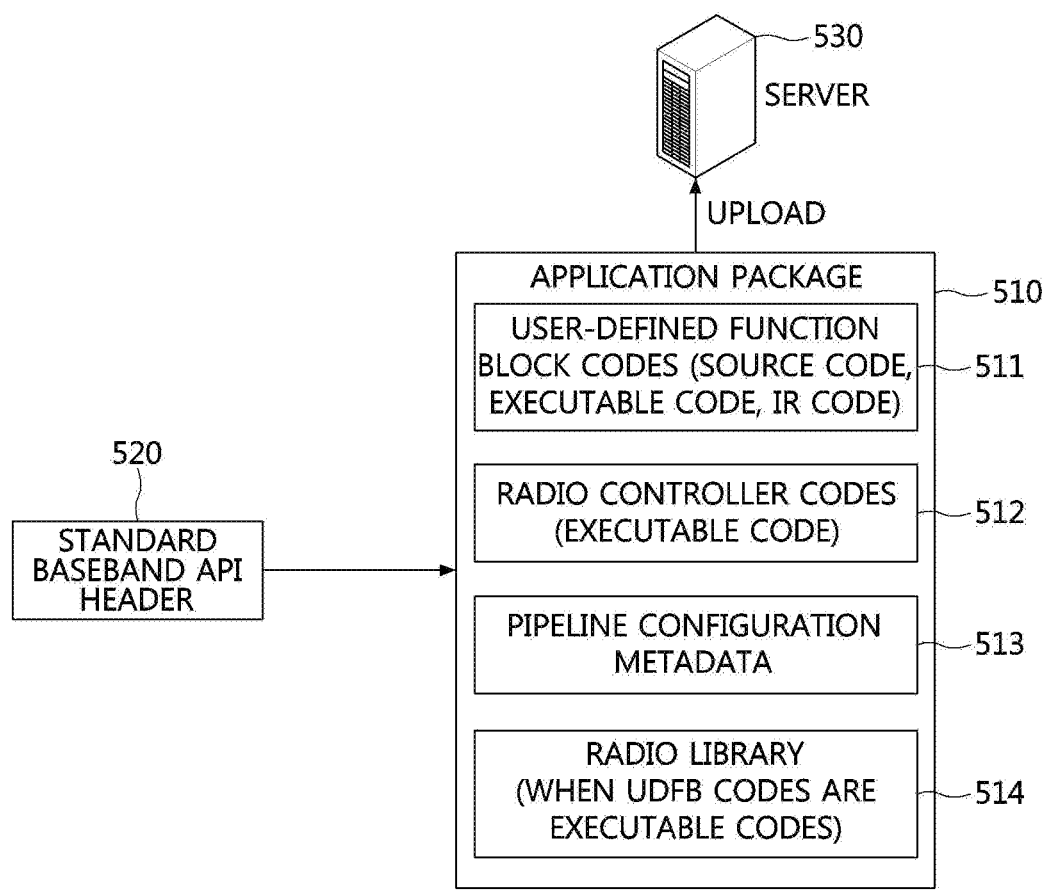
FIG. 24 is a block diagram to explain a configuration example of a radio application package which can be downloaded in a terminal device of FIG. 2.

FIG. 24 is a block diagram to explain a configuration example of a radio application package which can be downloaded in a terminal device of FIG. 2.

Referring to FIG. 24, at least one RA of a RAP 510 according to the present invention may comprise function blocks and a radio controller. That is, a RAP 510 may be configured to comprise user-defined function block codes 511, radio library, and radio controller codes 512 for them. Thus, the RAP 510 for distribution of radio application may basically comprise user-defined function block codes 511 and radio controller codes 512. Also, it may further comprise pipeline configuration metadata 513.

The radio controller codes 512 may be determined to be included in the RAP 510 in executable code form of either the RP 610 or the AP 110 according to the above-described software architecture environment That is, the radio controller codes 512 may be configured as codes executable on the AP 110 if the RCF 126 is divided into the AP 110 layer part and the RP 610 layer part and the radio controller codes may be configured as codes executable on the RP 610 if the RCF 126 is executed only on the RP 610.

Meanwhile, the user-defined function block codes 511, as mentioned earlier, are codes which always operate on the RP 610, and so the RAP 510 may include the user-defined function block codes in executable code form of the radio processor 610, in source code form, or in IR form.

The pipeline means a combination of radio controller, user-defined function blocks 516, and standard function blocks 517-1~M for implementing transmission or reception functions of the RA and their relations, and may be defined based on the pipeline configuration metadata 513.

Also, if the standard function block codes are configured as codes executable on cores of the RP 610, the RAP 510 may be configure to further comprise radio library 514 in executable code form (executable code of cores of the radio processor 610) as explained earlier.

The RAP 510 may be built to include a standard baseband API header 520 by provider, uploaded to the server 530, and downloaded from a server 530 onto the OS 112 of the AP layer and the user-defined function block codes 512 and the radio library 514 may be loaded on the radio OS of RP layer, a real-time OS, through loading from AP 110 to RP 610 with reference to the pipeline configuration metadata 513.

Figure 25:
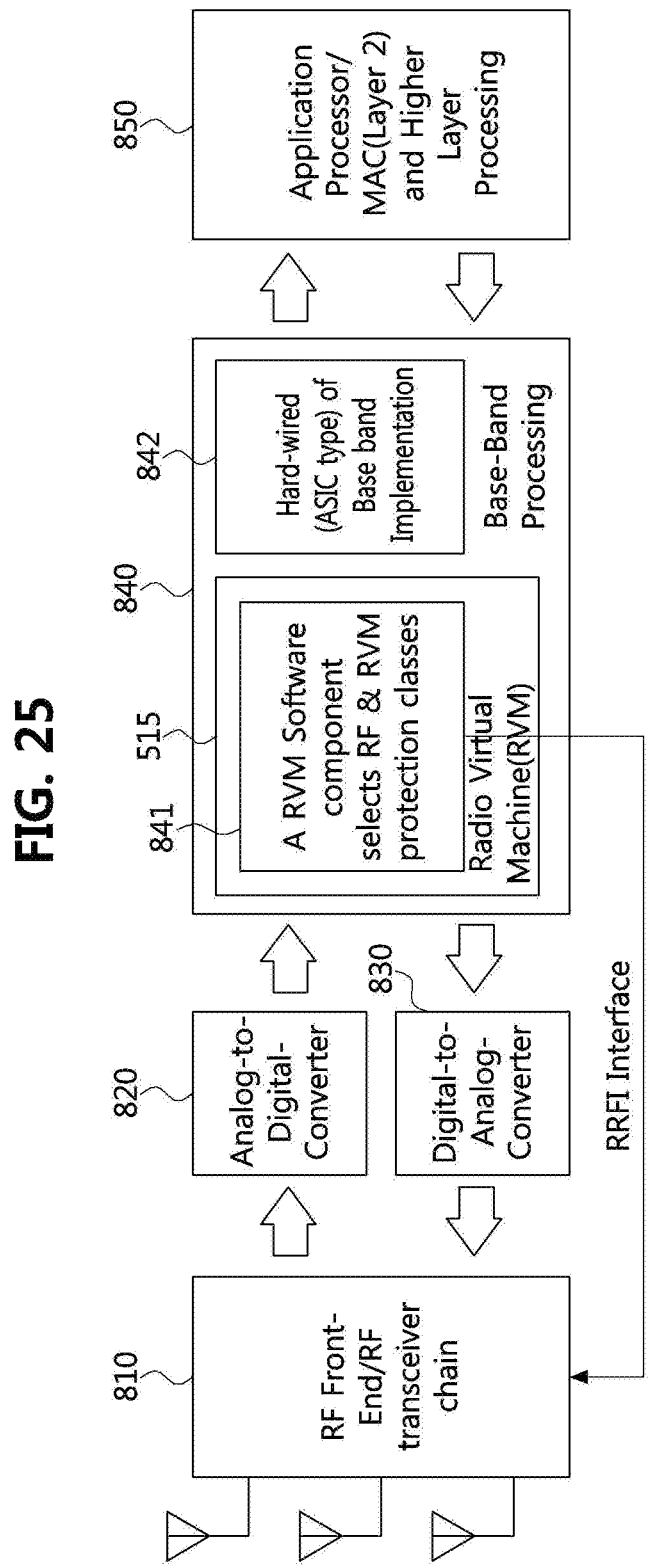
FIG. 25 is a block diagram schematically illustrating architecture of a terminal device of FIG. 2.

FIG. 25 is a block diagram schematically illustrating architecture of a terminal device of FIG. 2.

Referring to FIG. 25, a terminal device according to an embodiment may comprise a radio virtual machine (RVM) 515 and an application specific integrated circuit (ASIC) type baseband implement integrated circuit for baseband processing e.g. hard-wired) 842, a RF front-end chain, and a RF transceiver chain 810. The software component of the RVM may select RF and RVM protection class. Also, the baseband processing part 840 may be connected to the AP or MAC (layer 2) and higher layer processing part 850.

Also, the terminal device may comprise analog-digital converter 820 and digital-analog converter 830 between the RF front-end chain or the RF transceiver chain 810 and the baseband processing part 840. Here, the analog-digital converter 820 and digital-analog converter 830 may be implemented based on conventional interface standards such as DigiRF, etc. which are not specified by the RRFI.

The RF front-end chain, RF transceiver chain 810, software component 841 of the RVM, and the baseband implement integrated circuit 842 may be connected to each other via RRFI according to the present invention.

The Radio library 514 includes a full set of standard functional blocks (SFBs) (ETSI EN 303 095). The radio library 514 is classified into two as follows.

A reference radio library 220 provides a normalized description of each standard functional block (SFB). A native radio library 230 provides a platform-specific description of each SFB that represents the target platform hardware.

The SFBs are expressed in aspect of a native implement according to calculation rule description contained in the radio library 514, a front-end or back-end compilation, or each used radio library. The reference radio library 220 and the native radio library 230 will be described in detail as follows.

The reference radio library 220 includes a normalized description of all standard function blocks (SFBs). The reference radio library 220 includes information for each operator to download in the basic operation 410 of the above-described radio virtual machine (RVM) 515. Each operator corresponds to a standard function block (SFB) defined in ETSI EN 303 095.

The reference radio library 220 includes a normalized description of all standard functional blocks (SFBs).

Each standard function block (SFB) corresponds to an operator used for radio computing. For example, FFT, IFFT, Convolution, and so on. The normalized descriptions for each standard functional block (SFB) may be given in a higher level language, such as C, C++, and C#, to be referenced by a provider of the third party.

The normalized description includes other information such as the cost of each function of standard function blocks (SFBs) for use by a third party during the creation of the RA code. Typical candidates for standard function blocks (SFBs) are given in Annex B of ETSI TS 103 146-4.

Most of the basic level of SFBs is expressed as an elementary standard functional block (elementary SFB, eSFB). The eSFB is a terminal library element, and the eSFB cannot be divided into smaller level of elements. Table 18 shows the operators defined by element standard function blocks (eSFBs).

TABLE 18

| Name | Input | Output | Description |
| --- | --- | --- | --- |
| NOP | 1 | 1 | No operation, coping input to output. |
| Copy operator | 1 | 2 | Coping 1 input to 2 output. |
| Filter | 2 | 1 | 1 predicate input and 1 data input, if predicate input is true than coping data input to output. |
| Multiplexer | 2 | 1 | Any input triggers coping this input to output. |
| Demultiplexer | 2 | 2 | If predicate is true than copy input to the $1^{st}$ output else to the $2^{nd}$. |
| Return | 1 | 1 | Stop configuration execution with corresponding code sent to output. |
| Add | 2 | 1 | Returns the sum of two inputs. |
| Subtract | 2 | 1 | Subtract the second input from the first input. |
| Multiply | 2 | 1 | Returns the multiple of two inputs. |
| Divide | 2 | 1 | Devices one input value by the other input. |
| Logical AND | 2 | 1 | Returns true if both inputs can be converted to true; otherwise, returns false. |
| Logical OR | 2 | 1 | Returns true if either input can be converted to true; if both can be converted to false, returns false. |
| Logical NOT | 1 | 1 | Returns false if input can be converted to true; otherwise, returns true. |
| Bitwise AND | 2 | 1 | Returns a one in each bit position for which the corresponding bits of both inputs are ones. |

TABLE 18-continued

| Name | Input | Output | Description |
|---|---|---|---|
| Bitwise OR | 2 | 1 | Returns a one in each bit position for which the corresponding bits of either of both inputs are ones. |
| Bitwise XOR | 2 | 1 | Returns a one in each bit position for which the corresponding bits of either but not both inputs are ones. |
| Bitwise NOT | 1 | 1 | Inverts the bits of its input. |
| Left shift | 1 | 1 | Shifts a in binary representation b (<32) bits to the left, shifting in zeroes from the right. |
| Right shift | 1 | 1 | Shifts a in binary representation b (<32) bits to the right, discarding bits shifted off. |
| Preincrement | 1 | 1 | Increment input by 1, then use the new value of input in the current operation. |
| Postincrements | 1 | 1 | Use the current value of input in the current operation, then increment input by 1. |
| Predecrement | 1 | 1 | Decrement input by 1, then use the new value of input in the current operation. |
| Postdecrements | 1 | 1 | Use the current value of input in the current operation, then decrement input by 1. |

Table 18 is a table showing the eSFB list.

Figure 26:
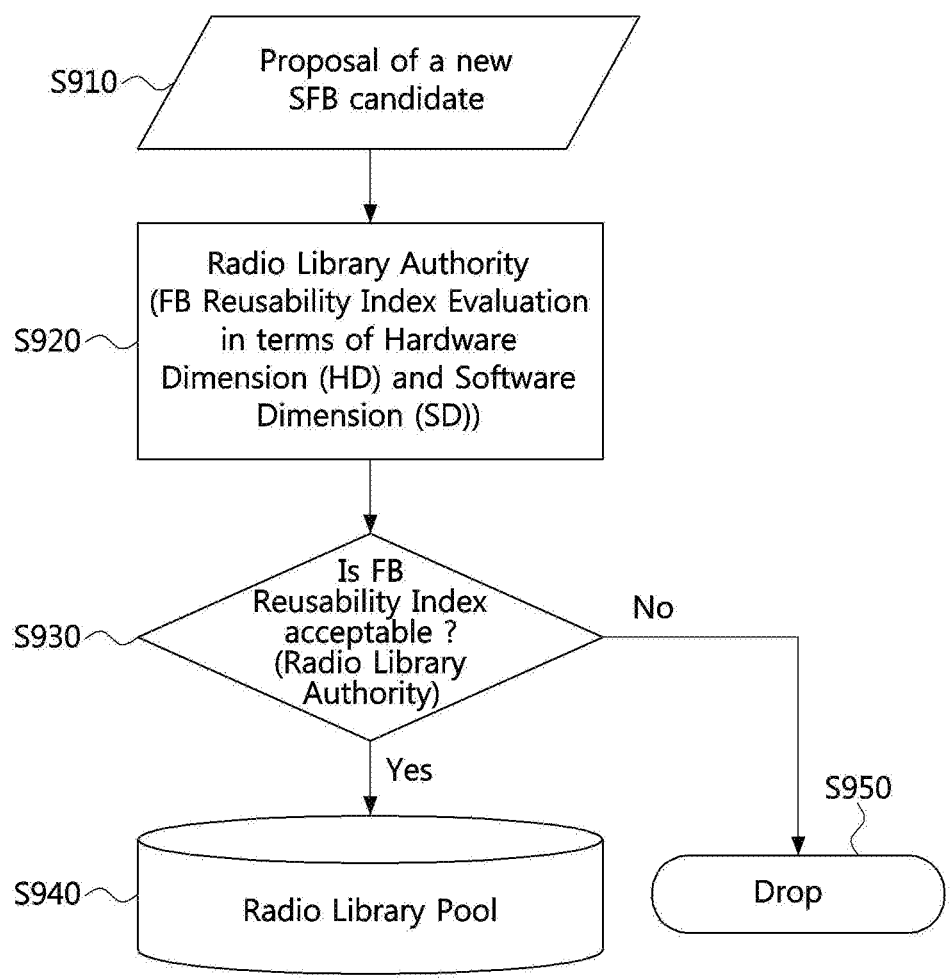
FIG. 26 is a flowchart of a method for determining standard functional blocks according to the present embodiment.

FIG. 26 is a flowchart of a method for determining standard functional blocks according to the present embodiment.

A method of determining standard functional blocks according to the present embodiment may determine whether a Radio Library Authority (RLA) registers a candidate SFB as a new SFB when a new SFB candidate is proposed (S910). How often a candidate functional block is used in the radio library and/or how important it may be considered as a key factor in the RLA.

As shown in FIG. 26, in order to be considered as the SFB candidate, the candidate FB may be expressed in the form of a reference code. The reference code may be comprised an appropriate combination of eSFBs. An evaluation index such as the FB reusability index (FBRI) shown in FIG. 26 may be set by RLA in term of all factor related to hardware and software. Hardware dimension (HD) and software dimension (SD) are respectively related to a hardware-related factor of the candidate FB and a software-related factor of the candidate FB. In the evaluation of HD, the candidate FB may be evaluated in terms of the degree of performance improvement, hardware implementation difficulty, and time to market, etc. In the evaluation of the SD, the candidate FB may be evaluated in terms of software correctness and completeness, intellectual property rights (IPR) licensing requirements, complexity and/or reusability of FB algorithms, etc.

The basic candidates of the above-mentioned standard function blocks (SFBs) are shown in Tables 19 to 23 below.

TABLE 19

| Classification | Data type | Range | Byte |
|---|---|---|---|
| integer | char | −128~127 | 1(8) |
| | unsigned char | 0~255 | 1(8) |
| | short | −32768~32767 | 2(16) |
| | int | −2147483648~2147483647 | 4(32) |
| | long | −2147483648~2147483647 | 4(32) |
| | unsigned short | 0~65535 | 2(16) |
| | unsigned int | 0~4294967295 | 4(32) |
| | unsigned long | 0~4294967295 | 4(32) |
| real-floating type | float | 8.4*10^−37~3.4*10^39 | 4(32) |
| | double | 2.2*10^−309~1.8*10^309 | 8(64) |

TABLE 20

| Name | Syntax | Number of operands | Description |
|---|---|---|---|
| Basic assignment | a = b | 2 | Allocate b to a |
| Addition | a + b | 2 | Add a to b |
| Subtraction | a − b | 2 | Subtract b from a |
| Multiplication | a * b | 2 | Multiply a with b |
| Division | a / b | 2 | Divide b from a |
| Modulo (integer remainder) | a % b | 2 | Modulo b from a |
| Increment Prefix | ++ a | 1 | |
| Postfix | a ++ | 1 | |
| Decrement Prefix | -- a | 1 | |
| Postfix | a -- | 1 | |

TABLE 21

| Name | Syntax | Number of operands | Description |
|---|---|---|---|
| Equal to | a == b | 2 | |
| Not equal to | a != b | 2 | |
| Greater than | a > b | 2 | |
| Less than | a < b | 2 | |
| Greater than or equal to | a >= b | 2 | |
| Less than or equal -to | a <= b | 2 | |

TABLE 22

| Name | Syntax | Number of operands | Description |
|---|---|---|---|
| Logical negation (NOT) | ! a | 1 | |
| Logical AND | a && b | 2 | |
| Logical OR | a \|\| b | 2 | |

TABLE 23

| Name | Syntax | Number of operands | Description |
|---|---|---|---|
| Bitwise NOT | ~a | 1 | |
| Bitwise AND | a & b | 2 | |
| Bitwise OR | a \| b | 2 | |
| Bitwise XOR | a ^ b | 2 | |
| Bitwise left shift | a << b | 2 | |
| Bitwise right shift | a >> b | 2 | |

As shown in Tables 19 to 23, the basic candidates of the SFBs include an integer and a real-floating type, etc., or candidates related to an arithmetic operation, candidates related to a comparison operation, candidates related to a logic operation, and candidates related to a bitwise operations.

Figure 27:
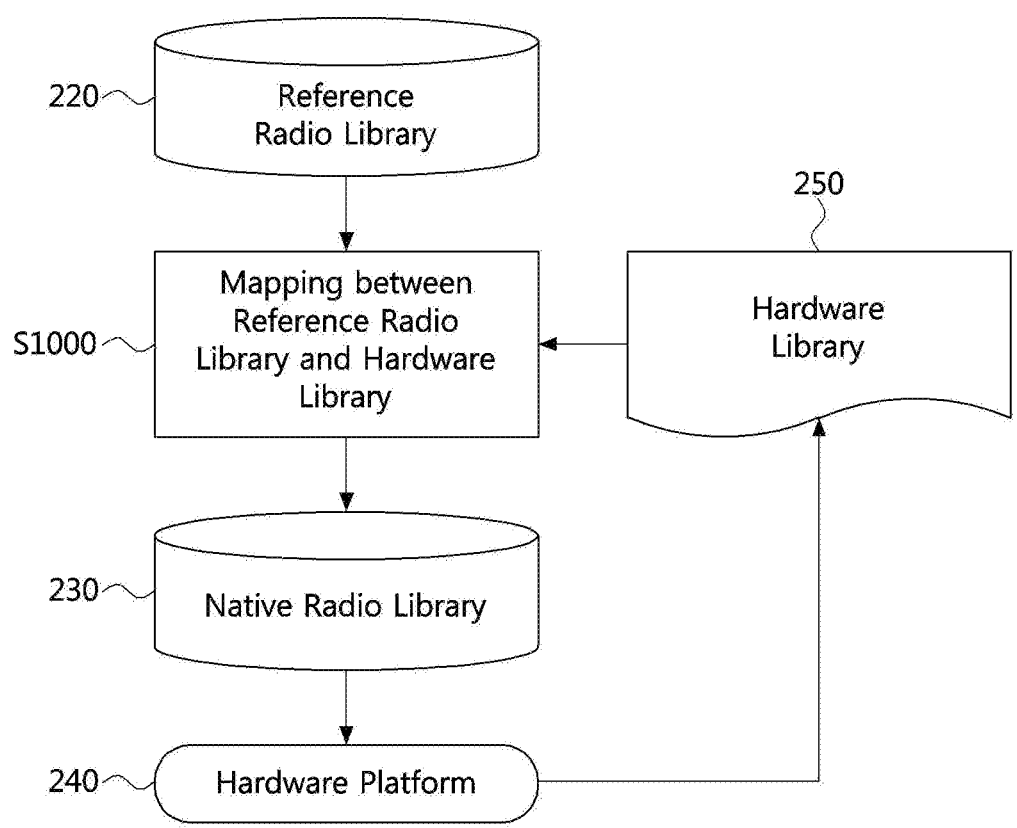
FIG. 27 is a flowchart of a method for creating a native radio library according to the present embodiment.

FIG. 27 is a flowchart of a method for creating a native radio library according to the present embodiment.

The native radio library 230 according to the present embodiment includes information on a method for implement each standard functional block (SFB) of reference radio library 220 in target hardware platform. The information explicitly specifies each standard function block (SFB) implementation in the reference radio library 220 using a programmable device provided by the dedicated hardware accelerator 123-2 and target hardware platform. The native radio library 230 may be used for back-end compilation of configuration codes (Configcodes).

As shown in FIG. 27, the native radio library 230 may be performed based on the reference radio library 220. The reference radio library 220 may be an openness, standards and public availability and a hardware (H/W) library 250. The hardware library 250 may be mounted on a target hardware platform. The elements of the native radio library 230 may be created by mapping elements of the reference radio library 220 to elements of the hardware library 250 (S1000).

Table 24 shows mapping between XML and binary.

TABLE 24

| XML schema | Binary format | Description |
| --- | --- | --- |
| TaskID | Task_ID | Task identifier. |
| RPIVersion | RPI version | Version of RPI. |
| DeveloperID | Developer_ID | Developer identifier. |
| CreationDate | Creation_Date | Date of task creation. |
| ReferenceID | Reference_ID | SFB identifier of reference Radio Library. |
| TaskImpVersion | Implementation version | Task implementation version. |
| Num | NAF | Contain number of configurations in the task. |
| LCF | LCF | Last Config Flag. Identify last configcode in the task. |
| NDO | N_DO | Number of data objects in the configuration. |
| NAPE | N_APE | Number of APE in the configuration. |
| ID(DO) | DO_ID | Automatically generated identifier. |
| Size | SIZE | Size of data object. |
| AccT | ACCESS TIME | Accesses time of data object. |
| Length | LENGTH | Length of initial data in object. |
| Data | VARIABLE LENGTH FIELD | Initial data. |
| APENum | N | Number of APE connected to data object. |
| APEid | APE_ID | APE identifier. |
| PortId | APE_Port_ID | Port identifier. |
| Type | Not applicable | Size of data object. |
| PortRef | Not applicable | Port of the main control operator, to which Virtual DO is connected. |
| InPortRef | Not applicable | Port of the main control operator, which will be the input port for the Virtual DO. |
| OutPortRef | Not applicable | Port of the main control operator, which will be the output port for the Virtual DO. |
| ID(APE) | APE_ID | Automatically generated identifier. |
| OpCode | Op code | OpCode of implemented function. |
| T | T | Flag for dynamic operations. |
| Cost | Cost | Execution cost value. |
| Time | Time | Time constrain value. |
| PortNum | NN | Number of Switch ports for APE |
| AccType | Port access type | Accesses type. |

Referring to Table 24, a binary format may be mapped to an XML schema.

In the above-described embodiments, a mapping relationship of RPI (Radio Programming Interface) in the information model and protocol of the reconfigurable mobile device is shown in Table 25 as follows.

TABLE 25

| Entity/Component/Unit | System Requirements [i.6] | Comments |
| --- | --- | --- |
| Radio Programming Interface | R-FUNC-MDR-04 | The reconfigurable MD shall provide a suitable interface which conveys structural and behavioural information of RAs for the reconfigurahle MD reconfiguration. The requirement is described in clause 6.4.4 of ETSI EN 302 969 [i.6] . |
| Radio Virtual Machine | R-FUNC-MDR-13 | Radio Application(s), SFB(s) or UDFB(s) shall be executed on a suitably configured Radio Virtual Machine, including the application of a suitable protection class. The requirement is described in clause 6.4.13 of ETSI EN 302 969 [i.6]. |

TABLE 25-continued

| Entity/Component/ Unit | System Requirements [i.6] | Comments |
|---|---|---|
| | R-FUNC-MDR-14 | A Radio Virtual Machine may consist of several smaller Radio Virtual Machines. The requirement is described in clause 6.4.14 of ETS EN 302 969 [i.6]. |
| | R-FUNC-MDR-15 | A Radio Application shall select a suitable Radio Virtual Machine Protection Class. The requirement is described in clause 6.4.15 of ETSI EN 302 969 [i.6]. |
| Radio Library | R-FUNC-FB-06 | A library extension shall be supported. The requirement is described in clause 6.3.6 of ETSI EN 302 969 [i.6]. |

In Table 25, the system requirements for a reconfigurable mobile device may be found in the ETSI EN 302 969 document.

The above-described methods according to embodiments of the present invention may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present invention, and vice versa.

While embodiments of the present disclosure and their advantages have been described in detail above, it should be understood that various changes, substitutions and alterations may be made herein without departing from the scope of the disclosure.

The invention claimed is:

1. A terminal device for executing a radio application independent of hardware, the terminal device comprising:
 a radio computer or a radio processor;
 an application processor; and
 a radio virtual machine (RVM),
 wherein the RVM includes:
  at least one data object (DO) that is an abstraction resource abstracting a memory;
  at least one abstract processing element (APE) abstracting different hardware resources according to a platform of the terminal device; and
  a control unit (CU) determining a behavior of the at least one DO and the at least one APE according to a configuration code, and
 wherein the RVM has a hierarchical structure in which the at least one APE is replaced with at least one elementary radio virtual machine (eRVM).

2. The terminal device according to claim 1,
 further comprising an abstract switch fabric (ASF) configured to connect the at least one DO with the at least one APE,
 wherein the CU further determines a behavior of the ASF according to the configuration code.

3. The terminal device according to claim 2,
 wherein each of the at least one DO comprises:
 an initialization field initializing the each of the at least one DO;
 a set field setting an attribute of the each of the at least one DO;
 an ASF interface for communications between with the each of the at least one DO and the at least one APE; and
 a status interface providing status information of the each of the at least one DO to the CU.

4. The terminal device according to claim 3,
 wherein the ASF interface comprises:
 a data status signal indicating whether the each of the at least one DO is full or empty; and
 a data line transmitting and receiving data between the each of the at least one DO and the at least one APE,
 wherein the status interface comprises:
 a full/empty unit indicating whether the each of the at least one DO is full or empty; and
 an exception unit describing a cause of a failure when the at least one APE operates with the each of the at least one DO.

5. The terminal device according to claim 2,
 wherein each of the at least one APE comprises:
 an initialization field bringing an operation code from basic operations;
 a set field configuring an instruction for setting the each of the at least one APE;
 an APE port including a data interface for connecting with the ASF; and
 a status interface providing status information of the each of the at least one APE to the CU.

6. The terminal device according to claim 5,
 wherein the data interface comprises:
 a data status signal indicating whether each of the at least one DO is full or empty; and
 a data line writing or reading data through the ASF,
 wherein the status interface comprises:
 an active/inactive unit indicating a status of the each of the at least one APE as an indication on whether the each of the at least one APE is active or inactive; and
 an exception unit describing a cause of a failure when an error occurs in the each of the at least one APE.

7. The terminal device according to claim 2,
 wherein the ASF comprises:
 an internal data port connecting the ASF with the at least one DO through an ASF interface line of the at least one DO;

a processing port connecting the ASF with the at least one APE through data interface lines of the at least one APE;

an interface allowing the CU to configure the ASF;

a connection unit configured transferring values of the interface allowing the CU to configure the ASF between the internal data port and the processing port; and an external data port connecting the ASF with other eRVM or a plurality of DOs from the RVM when the RVM is extended horizontally.

8. The terminal device according to claim 7, wherein the interface allowing the CU to configure the ASF comprises:

an initialization unit connecting the at least one DO and the at least one APE to a plurality of ports; and a setting unit generating a connection unit between the plurality of ports.

9. The terminal device according to claim 1, wherein the RVM further includes a program memory storing the configuration code.

10. The terminal device according to claim 1, wherein the RVM includes a Just-in-Time (JIT) back-end compiler or an Ahead-of-Time (AOT) back-end compiler.

11. The terminal device according to claim 1, wherein the configuration code includes a user defined functional block code configuring user defined functional blocks of the radio application, and an execution code which is executable on a radio platform and executes a radio library configuring standard functional blocks used by the radio application.

12. The terminal device according to claim 11, further comprising a radio hardware abstraction layer (HAL) executing a standard functional block implemented in hardware logic among the standard functional blocks, wherein the radio hardware abstraction layer is on a layer of the radio processor.

13. The terminal device according to claim 1, wherein the configuration code includes a code included in a radio application package (RAP) downloaded from a server.

14. The terminal device according to claim 1, further comprising a radio control framework (RCF) providing an operating environment to the radio application.

15. The terminal device according to claim 14, wherein the radio control framework comprises:

a configuration manager (CM) configured to perform installation/uninstallation and instance creation/deletion of the radio application, and manage radio parameters;

a radio connection manager (RCM) configured to manage activation/inactivation of the radio application and a user data flow switch between radio applications;

a flow controller (FC) configured to control transmission/reception and flow of a user data packet;

a multi-radio controller (MRC) configured to schedule requests for spectrum resources from radio applications; and a resource manager (RM) configured to share radio resources between radio applications.

* * * * *